United States Patent
Kimball et al.

(10) Patent No.: US 10,102,110 B1
(45) Date of Patent: Oct. 16, 2018

(54) SIMULATION PROCESS FOR INTERFACE BEHAVIOR

(71) Applicants: John D. Kimball, Fredericksburg, VA (US); James Alan Thomas, King George, VA (US)

(72) Inventors: John D. Kimball, Fredericksburg, VA (US); James Alan Thomas, King George, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 201 days.

(21) Appl. No.: 15/178,276

(22) Filed: Jun. 9, 2016

Related U.S. Application Data

(60) Provisional application No. 62/173,533, filed on Jun. 10, 2015.

(51) Int. Cl.
*G06F 8/30* (2018.01)
*G06F 11/36* (2006.01)
(Continued)

(52) U.S. Cl.
CPC ........ *G06F 11/3672* (2013.01); *G06F 3/0486* (2013.01); *G06F 8/38* (2013.01); *G06F 17/5009* (2013.01)

(58) Field of Classification Search
CPC .......... G06F 9/547; G06F 9/541; G06F 9/465; G06F 9/443; G06F 8/20; G06F 8/30; G06F 17/5022; G06F 11/3447
See application file for complete search history.

(56) References Cited

U.S. PATENT DOCUMENTS

| 6,098,073 A * | 8/2000 | O'Rourke ................. G06F 8/30 |
| 2009/0138891 A1 | 5/2009 | Winig et al. .................. 719/313 |

(Continued)

OTHER PUBLICATIONS

M. Thurau: "Akka Framework", University of Lübeck, 2012. https://media.itm.uni-luebeck.de/teaching/ws2012/sem-sse/martin-thurau-akka.io.pdf.

*Primary Examiner* — Charles E Anya
(74) *Attorney, Agent, or Firm* — Gerhard W. Thielman, Esq.

(57) ABSTRACT

An interface behavior simulator communications processor is provided for operating on a non-transitory computer platform for analyzing and sending a message between first and second components via a network. The adapter system includes a middleware provider, an elements loader, a connections loader, an elements finalizer, a message type identifier, a message broker, a brokering transmitter, a brokering initializer and a message reactor. The middleware provider transports the message over the network. The elements loader accesses a plurality of instruction elements, the including initializing, receiving, forking, joining, message mapping, filtering, publishing, activity diagramming and finalizing. The connections loader connects a first instruction element to a second instruction element in an action configuration. The elements finalizer locks the action configuration. The identifier determines a message type of an activity diagram element, in which the message types access the instruction elements for receiving and publishing. The message broker provides a communication protocol for the message. The brokering transmitter connects the instruction element for publishing to the message broker to produce a publishing interface element. The brokering initializer initializes the message broker. The message reactor executes a message instruction in reaction to the message.

5 Claims, 31 Drawing Sheets

(51) Int. Cl.
*G06F 17/50* (2006.01)
*G06F 8/38* (2018.01)
*G06F 3/0486* (2013.01)

(56) References Cited

U.S. PATENT DOCUMENTS

| | | | |
|---|---|---|---|
| 2009/0158246 A1* | 6/2009 | Sifter | G06F 8/20 717/105 |
| 2009/0300578 A1* | 12/2009 | Neil | G06F 9/4443 717/104 |
| 2014/0201418 A1 | 7/2014 | Turner et al. | 710/313 |
| 2015/0149570 A1* | 5/2015 | Harries | H04L 67/10 709/206 |
| 2016/0094483 A1* | 3/2016 | Johnston | H04L 47/827 709/226 |

\* cited by examiner

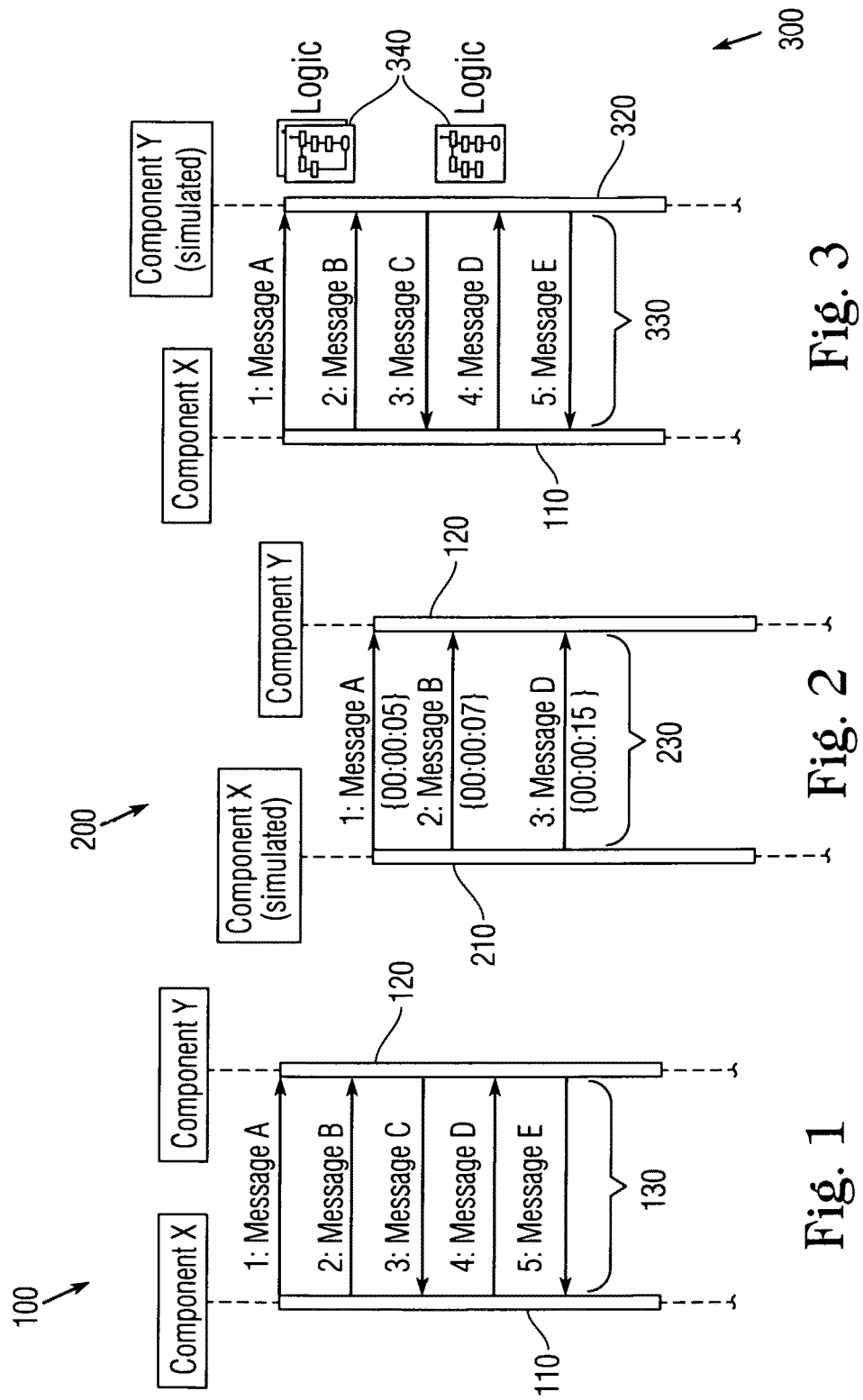

```xml
<?xml version="1.0" enclodng="UFT"?>
<beans xmlns="http://springframwork.org/schema/beans"
       xmlns:akka="http://akka.io/schema/akka"
       xmlns:xsi="http:www.w3.org/2001/XMLSchema-instance"
       xsi:schemaLocation="http://wwwspringframework.org/schema/beans etc
       \spring-beans-3.0.xsd http://akka.io/schema/akka etc\akka-2.0.xsd">
```
— 2800
Namesace and XML schema — 2810

```xml
<akka:actor-system id="mainActorSystem"
```
← Root of element (actor) hierarchy — 2815
```xml
    implementation= "akka.actor.ActorSystem"></akka:actor-system>
<akka:untyped-actor id="topLevelAD">
    implementation="pibs.elements.PBTopLevelActivityDiagram" parent="mainActorSystem">
    <?pibs_initial_location x="350 y="50"?>
```
— 2825
Unique element name (id)
```xml
</akka:untyped-actor>
</akka:untyped-actor id= "receiver" implementation="pibs.elements.PBSignalaReceiver"
    parent="topLevelAD" depends-on="topLevelAD">
```
← Hierachy/dependency information — 2830
```xml
    <?pibs_location x="350 y="50"?>
    <property name="eventType" value="GMT_Data"></property>
    <property name="logException" value="true"></property>
```
← UML element properties
```xml
    <property name="logMessage" value="false"></property>
    <property name="logReceived" value="true"></property>  2835
    <property name="logSend" value="false"></property>
</akka:untyped-actor>
```
Java class name
```xml
</akka:untyped-actor id= "final" implementation="pibs.elements.PBFinal"
```
— 2840
```xml
    parent="topLevelAD" depends-on="topLevelAD">
    <?pibs_Location x="351 y="392"?>
    <property name="logException" value="false"></property>
    <property name="logMessage" value="false"></property>
```
← Hierarchical UML element
```xml
    <property name="logReceived" value="false"></property>
    <property name="logSend" value="false"></property>
</akka:untyped-actor>
```
— 2820
```xml
</akka:untyped-actor id= "id_3" implementation="pibs.elements.PBSetInteger"
    parent="topLevelAD" depends-on="topLevelAD">
```
Screen coordinates of element
```xml
    <?pibs_location x="350 y="270"?>
    <property name="inEventType" value="GMT_data"></property>
```
— 2845
```xml
    <property name="logException" value="false"></property>  2850
    <property name="logMessage" value="false"></property>
    <property name="logReceived" value="true"></property>
```
Embedded expression
```xml
    <property name="logSend" value="false"></property>
    <property name="setExpression" value="(currentMsg.sequenceNumber + 1)"></property>
    <property name="varibleName" value="accumCount"></property>
</akka:untyped-actor>
```

Fig. 28A

```
<bean class="akka.spring."ActorConnectionBean" name="actorConnections">    2860
    <property name="connections">         connection mechanism
        <map>
            <entry key="id_3">          2865        Connections Between
                <map>                                UML Elements
                    <entry key="0 value="final"></entry>
                </map>                  "id" of "from" element    2870
            </entry>                                                2875
            <entry key="receiver">
                <map>                   Port number of "from" element
                    <entry key="0 value="id_3"></entry>
                </map>
            </entry>                    "id" of "to" element
        </map>
    </property>                         2880
</bean>
</beans>
```

SIMULATION PROCESS FOR INTERFACE BEHAVIOR

CROSS REFERENCE TO RELATED APPLICATION

Pursuant to 35 U.S.C. § 119, the benefit of priority from provisional application 62/173,533 with a filing date of Jun. 10, 2015, is claimed for this non-provisional application.

STATEMENT OF GOVERNMENT INTEREST

The invention described was made in the performance of official duties by one or more employees of the Department of the Navy, and thus, the invention herein may be manufactured, used or licensed by or for the Government of the United States of America for governmental purposes without the payment of any royalties thereon or therefor.

BACKGROUND

The invention relates generally to computer interface devices and protocols. The invention more particularly employs Unified Modeling Language (UML) to define Reactive Scenarios and related capabilities.

Complex, software-intensive systems are composed of software components (which, in turn, comprise one or more software applications), often distributed among a set of computers. Software components of a system typically communicate by exchanging messages, discrete units of communication, to carry information between the software components.

SUMMARY

Conventional interface simulation systems yield disadvantages addressed by various exemplary embodiments of the present invention. A communication processor is provided for operating on a non-transitory computer platform for analyzing and sending a message between first and second components via a network. The simulation adapter system includes a middleware provider, an elements loader, a connections loader, an elements finalizer, a message type identifier, a message broker, a brokering transmitter, a brokering initializer and a message reactor. The middleware provider initializes a message types list.

The elements loader accesses a plurality of instruction elements including initializing, receiving, forking, joining, message mapping, filtering, publishing, activity diagramming and finalizing. The connections loader connects a first instruction element to a second instruction element in an action configuration. The elements finalizer locks the action configuration.

The identifier determines a message type of an activity diagram element, in which the message types access the instruction elements for receiving and publishing. The message broker provides a communication protocol for the message. The brokering transmitter connects the instruction element for publishing to the message broker to produce a publishing interface element. The brokering initializer initializes the message broker. The message reactor executes a message instruction in reaction to the message.

BRIEF DESCRIPTION OF THE DRAWINGS

These and various other features and aspects of various exemplary embodiments will be readily understood with reference to the following detailed description taken in conjunction with the accompanying drawings, in which like or similar numbers are used throughout, and in which:

FIG. 1 is a block diagram view of message communication between components;

FIG. 2 is a block diagram view of preplanned (scheduled) simulation of message communication between a simulation and a component;

FIG. 3 is a block diagram view of reactive simulation of message communication between a component and a simulation;

FIG. 23 is a screen view of a Text Entry dialog box for a user-defined Expression;

FIG. 28 is a code list view of a Reactive Simulation Information Representation;

DETAILED DESCRIPTION

Figure 4:
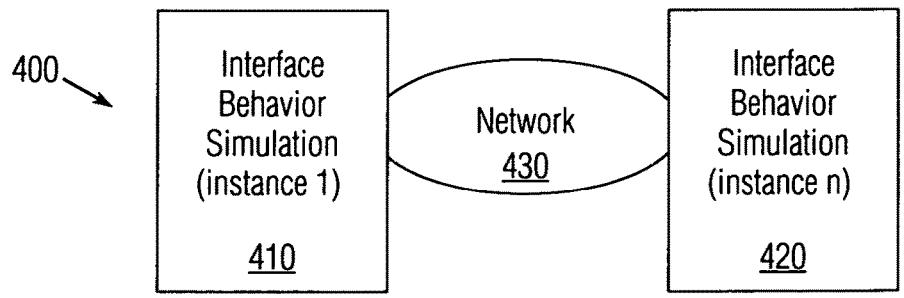
FIG. 4 is an operation view of interface behavior simulation applied as an exemplary embodiment.

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

In accordance with a presently preferred embodiment of the present invention, the components, process steps, and/or data structures may be implemented using various types of operating systems, computing platforms, computer programs, and/or general purpose machines. In addition, those of ordinary skill in the art will readily recognize that devices of a less general purpose nature, such as hardwired devices, or the like, may also be used without departing from the scope and spirit of the inventive concepts disclosed herewith. General purpose machines include devices that execute instruction code. A hardwired device may constitute an application specific integrated circuit (ASIC), digital signal processor (DSP), a field programmable gate array (FPGA) or other related component.

Several terms herein are presented as abbreviations. These include: Activity Diagram Editor (ADE), Article Under Test (AUT), Data Distribution Service (DDS), Embedded Expression Editor (EEE), Enterprise Integration Framework (EIF), eXtensible Markup Language (XML), High-Performance Reactive Simulation Environment (HPRSE), Interface Behavior Simulation (IBS), Reactive Logic Network (RLN), Shared Variable System (SVS), Software Transactional Memory (STM), Spring Expression Language (SpEL), Systems Modeling Language (SysML), Unified Modeling Language (UML), and Visual Programming Environment (VPE).

Various exemplary embodiments provide a technique, operable either as an apparatus or via a process, for configuring, designing, managing, executing, and visualizing simulations of message-based interface behaviors of software-intensive systems and software components. The purposes for the exemplary embodiments include the following capabilities:

Enable the rapid and cost-effective mockup of new or modified interface simulation scenarios for execution in verifying interface designs before being implemented;

Enable the rapid and cost-effective creation of interface simulations for use in early developmental testing of software components under development;

Enable the rapid and cost-effective creation of interface simulations for early testing of the integration among complex software components that form a larger system;

Enable the rapid and cost-effective creation of interface simulations for testing and certification of advanced prototypes, software components, systems, or systems of systems in a realistic environment;

Enable operators to leverage model-based engineering designs for systems and software in creating interface behavior simulations;

Enable operators without knowledge of computer programming to quickly and easily design interface behavior simulations in a highly visual manner;

Enable operators to quickly and easily configure interface simulations that can be used to simulate interface behaviors using different message sets, message topics, and simulation logic for many specific applications;

Enable operators to execute, view the execution status of, and visualize simulation scenarios;

Enable operators to modify, delete, export, and import simulation scenarios;

Provide a common Interface Behavior Simulation (IBS) apparatus that can be easily extended to use different middleware standards of communications with systems and software components;

Provide a highly scalable architecture for the IBS apparatus, to accommodate increased performance needs; and Provide an IBS apparatus that performs operations under different operating systems with no dependencies on third-party software on the target computer.

While an initial prototype instantiation of the invention was developed to support the Object Management Group's (OMG) Data Distribution Service (DDS) middleware for communications among software components, the exemplary apparatus was designed to be readily extendable to other middleware communications methods, messaging protocols, and message standards. Example middleware communications methods include: Common Object Request Broker Architecture (CORBA), web services, ZeroMQ, and Java Message Service (JMS).

Interface Behavior: Messages exchanged between two software components, as depicted in FIG. 1, comprise their interface. The behavior associated with such an interface can be surprisingly complex. Messages are designed in many different ways to achieve the purpose of an overall system. They may group information in various manners by the way in which they are defined. In addition, two software components may have complex interactions in which multiple messages are exchanged in a variety of sequences like that shown in FIGS. 1-3. Each sequence of interactions may have a specified flow of messages in a particular order and with a particular timing.

FIG. 1 shows a first diagram view 100 of components engaged in message exchange. A first Component-X 110 and a second Component-Y 120 exchange a first series of messages 130 identified as by labels A through E. In particular, messages A, B and D are sent from Component-X 110 to Component-Y 120, while messages C and E are sent from Component-Y 120 to Component-X 110. Components may have one, several, or many interactions like this. In addition, a system may be composed of many software components, all of which may interact with one another. This results in numerous interactions among software components in a complex system.

The content of messages may also be complex in that they may have a complicated data structure and may carry many different fields of information. These message fields may be related to one another. For example, a single field may be found in multiple messages, or different message fields found in different messages may correspond to or be associated with one another.

Many modern middleware communications approaches use a publish-subscribe messaging pattern. This typically means that software components that need to publish information in messages must register their intent to publish. Likewise, software components that need to access and use information in messages must register their subscription. In addition, the publish-subscription pattern often includes the grouping of related messages into logical topics. Such topics may be used in the registration for message publication and subscription.

A further complication of interface behavior is the fact that software components often store (persist) information (also called "persistent state data") based on data received in messages (i.e., the received data itself or other data derived from logical expressions that involve the data). Persistent state data may be used in the logic for processing subsequent messages. For example, receipt of a message with a particular field set to a specific value may change the processing of the next message received.

Lastly, interface behavior is complicated by the mapping of input messages to output messages, known as "message mapping." Before an output message is published, a software component may need to set its fields to specific values. For example, an output message field may be set to the value contained in a field of the input message being processed. Persistent state information, mentioned earlier, might also be used in an output message field. In general, setting the field of an output message might involve multiple, complex expressions involving input message fields, fixed values, and/or persistent state data. Taken together, these aspects of interface behavior potentially render that behavior very dynamic, reactive, and complicated.

Interface Behavior Simulation: Simulation of interfaces to a software component or system may be simple or complex. For example, the simplest simulation might be one that sends a message all of whose fields contain predefined values. Such a simulation has very limited utility.

FIG. 2 shows a second diagram view 200 of components engaged in preplanned (i.e., scheduled) simulation. A first simulated Component-X 210 and the second Component-Y 120 exchange a second series of messages 230 with specified chronological schedules. FIG. 3 shows a third diagram view 300 of components engaged in a reactive simulation. The first Component-X 110 and a second simulated Component-Y 320 exchange a third series of messages 330 using logic instructions 340. When a software component such as simulated Component-Y 320 shown in view 300 receives a message 330, the component applies its programmed logic 340 to process the message 330. This logic 340 may be complex. For example, fields of the message 330 might be checked to ensure that it contains acceptable values before the message 330 is further processed (message validation). The logic 340 may then branch, taking different actions (or no action) depending on values contained in specified fields of the incoming message. Output messages 330 might be published with specific contents as the result of the component's logic 340.

In general, an interface simulation might support preplanned (also known as "scheduled") simulation, or the simulation might support very reactive simulation. In a preplanned simulation shown in view 200, an operator defines a schedule of times for publishing messages 230. A preplanned simulation, however, does not react to incoming messages. On the other hand, a reactive simulation in view 300 does react to incoming messages 330, for example, applying complicated logic to determine its response.

Providing the most complete IBS capability requires addressing all the aspects of interface behavior mentioned above, including: definition of complex sequences of interactions, message structure and content, registration of publication and subscriptions, message topics, complicated logic definition, persistent state information, and message mapping. Such a robust simulation capability would also support the definition of both preplanned (scheduled) 200 and reactive simulation 300 scenarios. Exemplary embodiments provide for simulating all the previously-mentioned aspects of complex interface behavior. It does this in a scalable manner, to support the simulation of many different interfaces.

Computing Concepts: Exemplary embodiments utilize an actor-based computing paradigm to execute an interface behavior simulation. The actor model of computing, as described by M. Thurau: "Akka Framework" (2012), is based on small, independent units of computation ("actors") that exchange immutable messages. So, a computing problem (e.g., simulation) is analyzed and represented by a network of actors.

Software Transactional Memory (STM), also described by Thurau, is an advanced mechanism for facilitating fast, concurrent memory access. STM avoids using locks on memory, and is employed by multithreaded software. Mechanisms in STM are provided to handle conflicts in memory access (e.g., backup and retry). Exemplary embodiments incorporate STM to make shared variables available to concurrently executing simulations.

Example Applications of exemplary embodiments are identified as follows:

Concept Exploration: An IBS could be used to quickly create and simulate multiple components of a new system, leading to the design and refinement of interfaces among software components of the system. Similarly, an IBS could be employed to mock up interfaces to test and demonstrate a new or modified software component or prototype. This leads to discovering problems with both the concept and interface designs very early in the concept development phase, lowering the cost and schedule impacts as compared with finding problems late in development or integration.

System Development: While a software component is being developed, interface simulations can be quickly and cost effectively created and used in place of external components to test a software component under development. At this point in development, external components to the component under development are not yet available, but the component must be tested. Use of interface simulations leads to finding software integration problems earlier in the development phase, lowering the cost and schedule impacts of finding errors, and increasing software quality.

System Integration: Early integration of software components leads to a system that works better. However, all components are not always available at the same time during complex development activities. An IBS can be used to rapidly create a prototype of missing components, so that the integration of a system can be performed incrementally. Early detection of integration problems results in lowering the cost and schedule impacts, and increasing system quality.

Testing and Certification: During software component and system testing and certification, simulations are often required to simulate interfaces of systems external to the system under test. For example, a system may not be available at the needed location due to cost and/or equipment requirements. The IBS can be used to create the simulations that are needed in this case. A highly configurable IBS can be used to more cost effectively simulate external interfaces for many different systems. This avoids the cost of development of unique simulation tools for every system development effort.

Typical conventional methods for interface simulation involve the creation of unique, proprietary interface simulation software for each different software development project. Often, each software developer's organization develops a custom interface simulation tool for their component development, integration, testing, and certification effort.

To minimize the cost of simulation tool development, these tools are often very rudimentary, hard-coded and not rapidly reconfigurable for changing message standards, or interface behaviors. Many such tools offer only rudimentary preplanned simulation capabilities that are unable to simulate the dynamic, reactive interface behavior of real systems. Unique, non-standard, proprietary formats are often used to represent simulation scenarios for storage and execution. Hard-coded simulations can be expensive and time-consuming to modify. These require specialized computer programming knowledge to create and modify.

Conventional interface simulation tools are typically created for computer programmers. This increases training for and operation by non-programmers, as well as increased support from the programmers. Due to the minimalist approach to interface simulation development, such tools are not readily extendable to accommodate new or changing protocols or middleware communications methods. Conventional simulation tools do not provide scalable architectures, especially considering the increasing number of processing cores found in computers; they are unable to leverage this increased computing power. Few interface simulation tools can function under a variety of operating systems with no third-party software requirements on the target computer. These limitations restrict their capability and increase the cost of repurposing such tools for new or altered applications.

Several Enterprise Integration Frameworks (EIFs) that assert support the integration of disparate software exist, e.g., Apache Camel, Spring Integration, and Mule. However, their focus is on the translation of different data types among software applications, not the simulation of complex interface behavior. Some visual programming editors are available for EIFs, but they do not support a common, software modeling notation such as the Unified Modeling Language (UML). An EIF requires the operator to learn a particular programming language to use them. EIFs also do not perform or scale as well as exemplary embodiments described herein. Lastly, conventional methods for interface simulation do not leverage the power of model-based engineering. The UML object-oriented modeling language (as well as extensions) is predominantly used for system design, software design, and software development. However, these are not conventionally applied to interface simulations.

The key innovations of the exemplary embodiments include:

Creation, modification, and deletion of reactive interface behavior simulations using a Visual Programming Editor (VPE), based on model-based engineering artifacts, in particular, enhanced UML activity diagrams;

Creation, modification, and deletion of decision, shared variable, and message map expressions using a visual expression editor;

Information representation of reactive interface behavior logic in an eXtensible Markup Language (XML) format;

Method for creating and executing reactive scenarios; Method for reactively processing received messages using user-specified logic; Scalable architecture for reactive simulations of interface behavior;

Architecture that enables use of a variety of different middleware standards of communications with other software and systems;

Apparatus that operates under different operating systems with no requirements for third-party software on the target computer;

Configuration of messages and message topics for interface behavior simulation; and Export and import of reactive scenarios.

Description and operation: The scope of the exemplary embodiments extends to the following:

Interface Behavior Simulation (IBS) apparatus;
Visual Programming Environment (VPE);
Reactive simulation information representation;
High-Performance Reactive Simulation Environment (HPRSE);
Reactive scenario creation and execution method;
Reactive message processing method; and
Additional IBS functions.

FIG. 4 shows an operation view 400 of an IBS apparatus in a concept development application. A first instance IBS 410 connects to an $n^{th}$ instance of IBS 420 via a network 430. In this case, one or more instances of IBS, networked together (if necessary), simulate the interface behavior of systems or components before implementation. This enables early identification of interface design problem areas and the maturing of the interface designs. Such problems are typically discovered after implementation in the integration phase, when the problems are more expensive and troublesome to correct.

Figure 5:
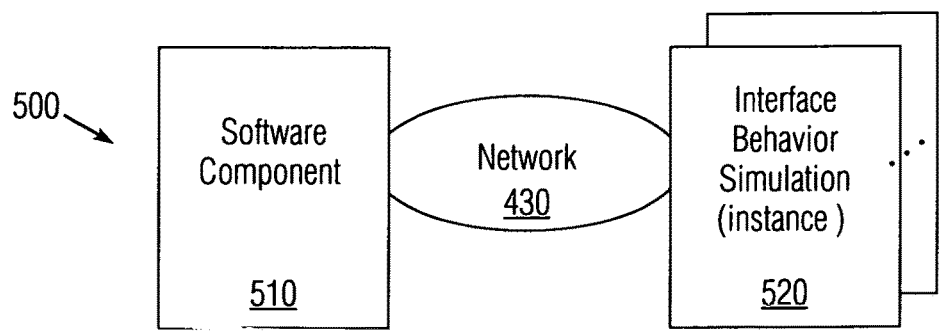
FIG. 5 is an operation view of interface behavior simulation applied in testing of a software component.

FIG. 5 shows an operation view 500 of IBS application to software components, including their development, testing and certification. A software component 510 that constitutes an Article Under Test (AUT) connects to an IBS 520 via the network 430. This configuration is useful during component development, testing, and certification activities. In this case, one or more instances of IBS 520 are used to simulate external systems or software components that interface with the AUT software component 510 over the network 430. During development of the AUT software component 510, other components or systems that are also under development may not be available. This application of IBS 520 enables early identification of problems that are typically found much later, when the problems are more expensive and troublesome to correct.

Figure 6:
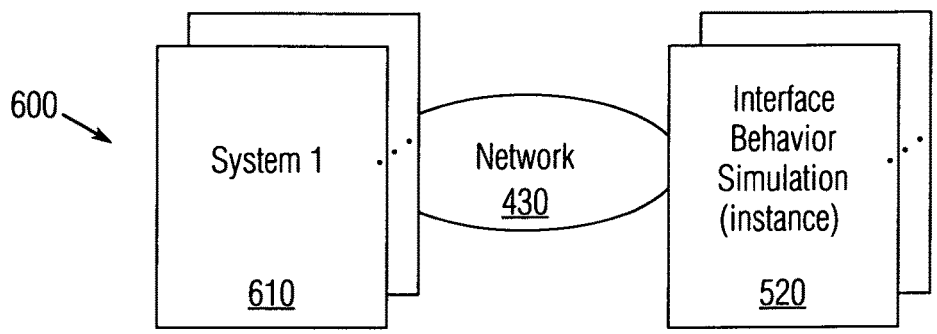
FIG. 6 is an operation view of interface behavior simulation applied in the integration testing or certification of a system.

FIG. 6 shows an operation view 600 of IBS application to systems, including integration, testing, or certification. A plurality of systems 610 connect to the IBS 520 via the network 430. In this case, one or more instances of IBS 520 are used to simulate systems external to the actual systems 610. During development of systems 610, other systems with which they interface over the network 430 may not be available, due to the expense of the associated equipment, scheduling, etc. In addition, during concurrent system development, component systems are often not completed at the same time. The ability to simulate external system interfaces enables earlier integration of the systems that are available at the time, leading to earlier identification of problems.

Figure 7:
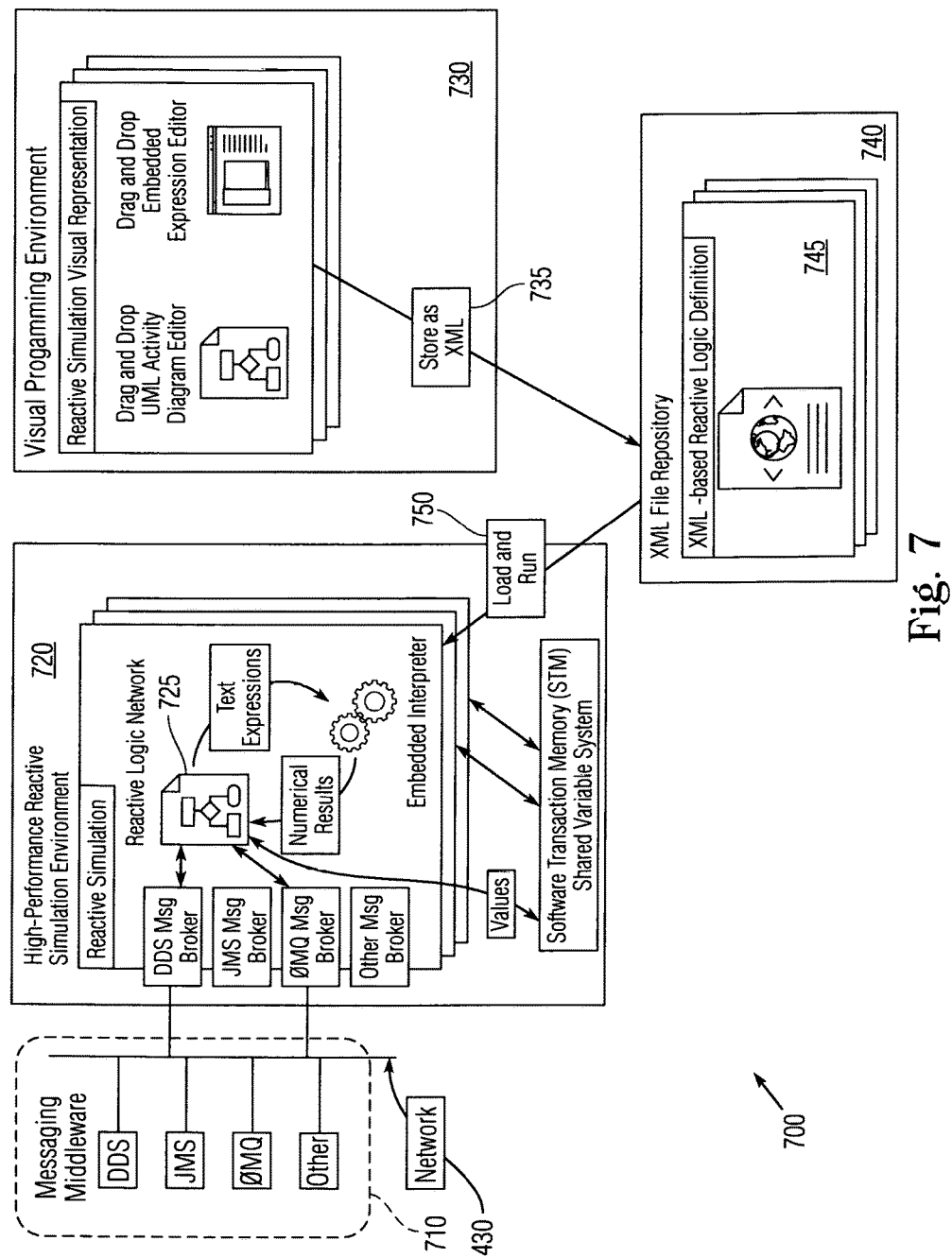
FIG. 7 is a block diagram view of an architecture for Interface Behavior Simulation.

FIG. 7 shows a block diagram view 700 of IBS architecture. A set of messaging middleware 710 connects to a High-Performance Reactive Simulation Environment (HPRSE) 720 with a Reactive Logic Network (RLN) 725. A Visual Programming Environment (VPE) 730 communicates with the RLN 725 via an XML File Repository 740 and stores results as an XML-based Reactive Logic Definition document 745 passing through a Load-and-Run function 750. As depicted in view 700, IBS 520 comprises three components: a VPE 730, an XML File Repository 740, and an HPRSE 720. The VPE 730 provides a visual representation of reactive simulations. The VPE 730 stores reactive scenarios in the XML File Repository 740, which encodes simulation logic definitions for reactive scenarios. The HPRSE 720 loads reactive scenarios from the XML File Repository 740 and executes them, using a variety of middleware communications standards.

Figure 8:
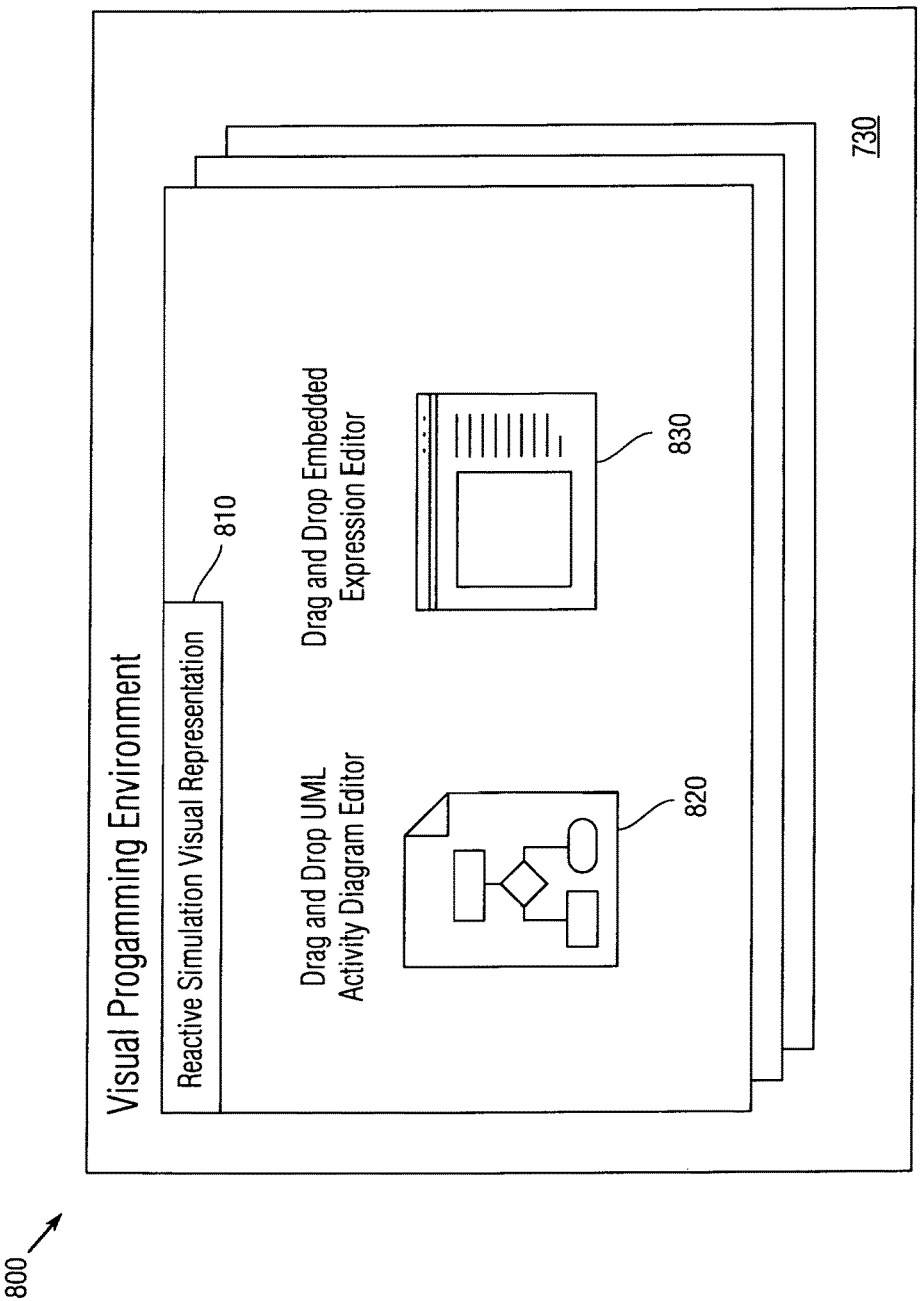
FIG. 8 is a block diagram view of an architecture for a Visual Programming Environment.

FIG. 8 shows a block diagram view 800 of the VPE 730 with Reactive Simulation Visual Representation 810. The VPE 730 includes a UML Activity Diagram Editor (ADE) 820, and an Embedded Expression Editor (EEE) 830. Both these components provide to the operator readily facilitated drag and drop methods of constructing aspects of reactive scenarios.

Figure 9:
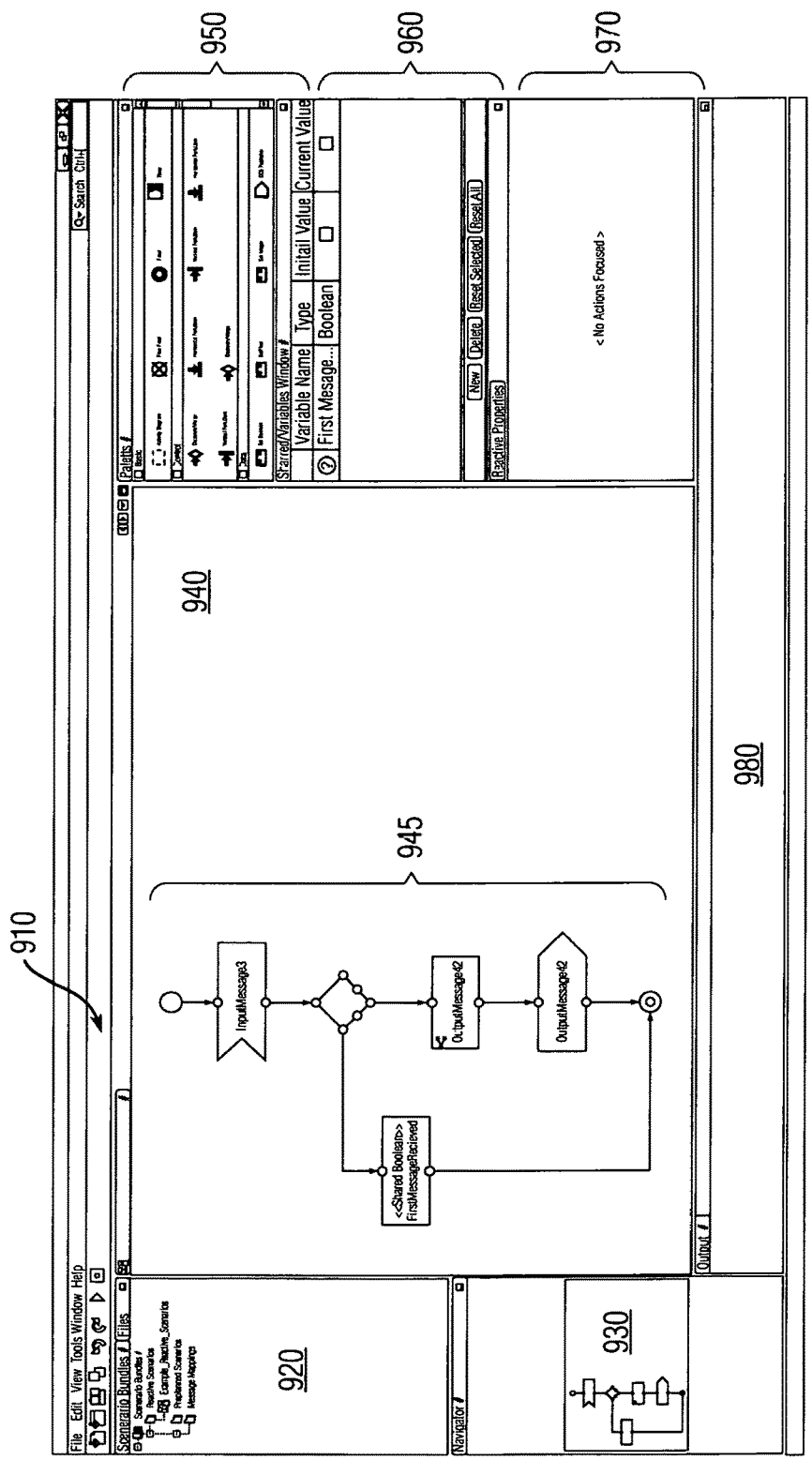
FIG. 9 is a screen view of an Activity Diagram Editor.

FIG. 9 illustrates a representative screen view 900 for the ADE 820 in the VPE 730. The ADE 820 includes a menu bar 910 a project area 920, a navigation panel 930, activity diagram section 940 with a reactive scenario diagram 945, an activity diagram palette 950, a shared variable editor 960, a reactive properties pane 970, and an output area 980. The project area 920 displays scenario names organized into scenario bundles. The navigation panel 930 enables an operator to adjust the portion of the reactive scenario diagram 945 that is visible in the center section 940, where activity diagrams may be displayed.

The upper right portion 950 of the screen layout view 900 shows the palette 950 of adapted UML symbols that may be employed to graphically create reactive scenarios. Properties specific to scenario elements are displayed in the reactive properties pane 970. The shared variable editor 960 enables an operator to create, modify, and delete variables that can be shared across reactive scenarios. In addition, their initial and current values may be set or reset. The screen layout view 900 is configurable by the operator, so that its different panes can be rearranged as desired. The ADE 820 thereby enables an operator to graphically construct a reactive scenario by combining and connecting UML elements.

Figure 10:
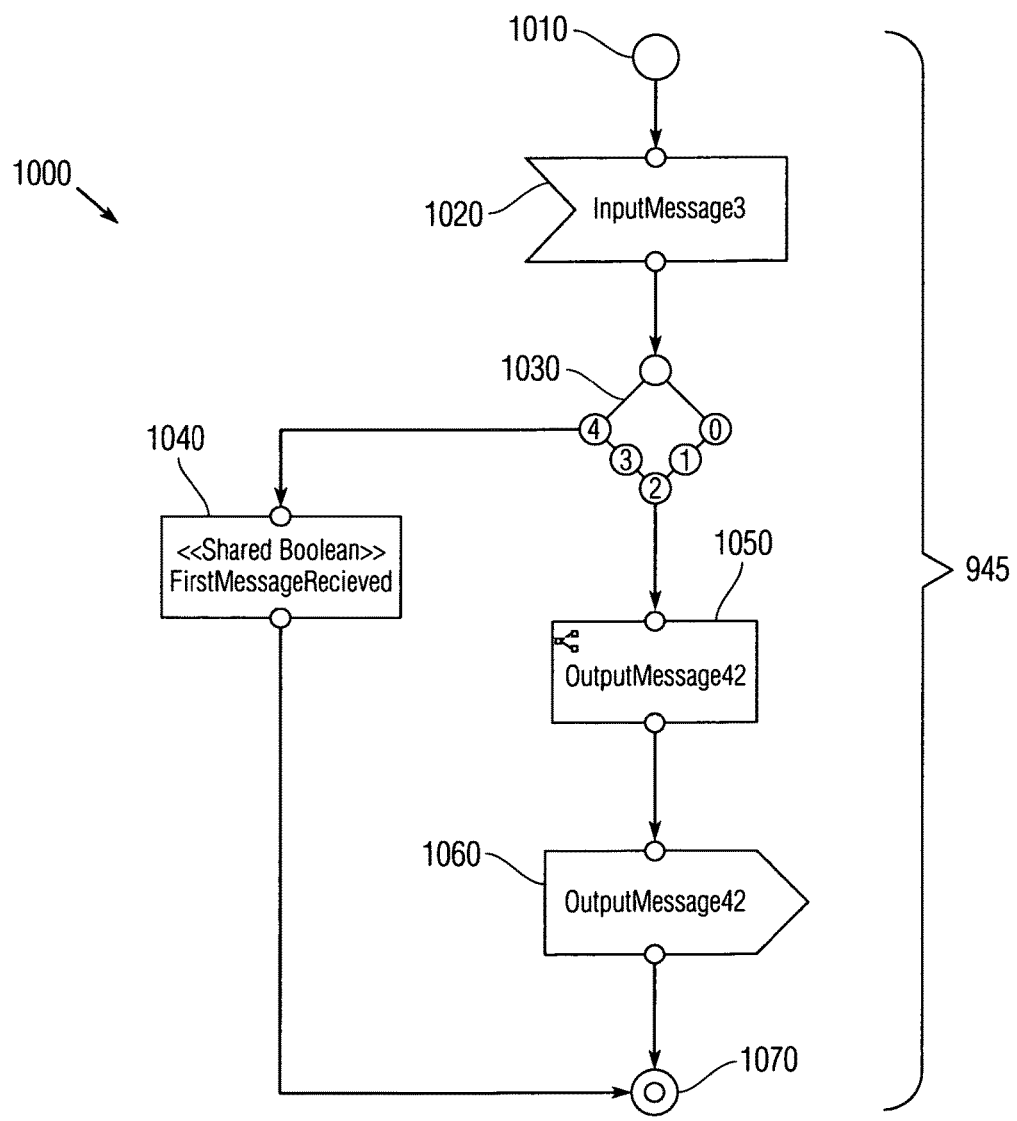
FIG. 10 is a detail view of an extended Unified Modeling Language (UML) used to define a Reactive Scenario Diagram.

The IBS 520 uses an adaptation of the UML Activity Diagram to represent reactive scenarios that describe interface behavior for simulation. An IBS activity diagram consists of an adapted form of UML elements that connect together. The connectors between UML elements represent the data flow of messages between the elements in the activity process. FIG. 10 shows an exemplary UML activity diagram view 1000 of an activity process that defines the reactive scenario diagram 945. An initial node 1010 provides a message connection, so that a message is received by a Receiver 1020. The message is forwarded to a logical Decision element 1030, which determines whether to forward the message to a Set Shared Variable element 1040 or to produce an output message to a Message Map element 1050, which maps the input message to an output message: OutputMessage42 in this example. A publisher element 1060 then publishes the message on the network 430. After either setting the shared variable FirstMessageReceived in the Set Shared Variable element 1040 or publishing the output message OutputMessage42 in the Publisher element 1060, the process terminates at a return node 1070.

The UML concept of data flow between connected UML elements can be used in the IBS 520 to represent the flow of messages processed by each element. An element of a reactive scenario diagram 945 may have one or two associated event types: e.g., an input event type and an output event type. The input and output event types indicate the type of message the element processes or produces, respectively. The IBS 520 automatically determines the event type of a UML element where possible. The operator can also set or modify event type(s) for each UML element. Furthermore, shared variables used to represent persistent state information may be needed for a simulation. At least one activity diagram may access and/or set the values of at least one shared variables. This enables the persistent state information to be shared across multiple activity diagrams.

Figure 11:
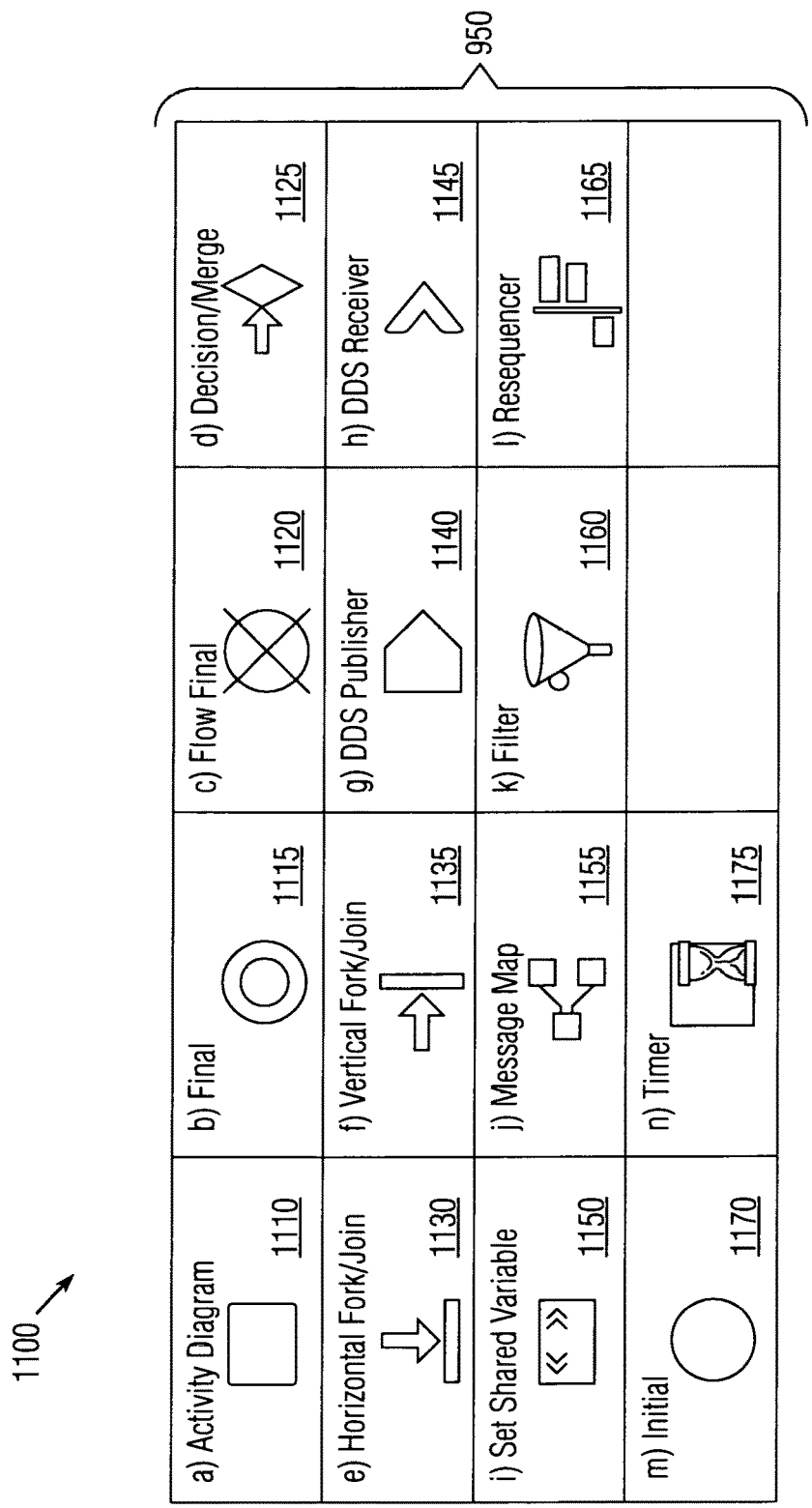
FIG. 11 is an icon set view of Scenario Elements.

Several UML elements can be adapted for the IBS 520. FIG. 11 shows an iconic view 1100 of the symbols and labels for each element displayed in the palette 950 in the upper right portion for constructing reactive scenarios. This includes elements for: Activity Diagram 1110, Final 1115, Flow Final 1120, Decision/Merge 1125, Horizontal Fork/Join 1130, Vertical Fork/Join 1135, DDS Publisher 1140, DDS Receiver 1145, Set Shared Variable 1150, Message Map 1155, Filter 1160, Re-sequencer 1165, Initial 1170 and Timer 1175. The elements Initial 1170 and Final 1115 have analogs in flowchart view 1000 for corresponding respective nodes 1010 and 1070. Each of these elements is briefly described below.

Activity diagram elements 1110 may be embedded in other activity diagrams, enabling for the modular construction of reactive scenarios. The Activity Diagram 1110 enables an operator to create a lower-level sub-activity diagram embedded in the current (higher level) activity diagram. The Final 1115 and Flow Final 1120 elements provide an IBS operator two options for the termination of each Activity Diagram 1110. The IBS 520 queues received messages for processing. Use of the Final element 1115 forces the reactive scenario diagram 945 defined by the Activity Diagram 1110 to handle one incoming message at a time. When processing, as defined in the Activity Diagram 1110, of one message has been completed, then another message will be processed. This promotes determinism in the simulation.

On the other hand, the use of the Flow Final element 1120 enables the processing of messages as they are received. As a result, multiple messages are processed simultaneously when executed by the simulation. This enables faster processing of received messages, but may result in less deterministic results. Decision and Merge elements 1125 incorporate the same graphical symbol. The Decision element 1030 creates a logical decision that leads to alternate flows in the diagram 945. Decision expressions are constructed using the EEE 830. A Merge element is used to combine alternate flows in a diagram.

Exemplary embodiments provide an input connection to the Decision element 1030 and five output connections (0-4) to branches therefrom. A logical expression under the Decision Element 1030 is associated with each of the output connections. One embodiment verifies the expressions starting in a clockwise direction. The branch of the first logical expression that evaluates to "true" is taken during execution of the simulation. The Horizontal Fork and Horizontal Join 1135 elements, designated by the same graphical symbol shown in view 1100, are used to manage concurrent processing in an activity diagram. The Horizontal Fork splits a diagram's flow into concurrent flows. The Horizontal Join is used to synchronize incoming concurrent flows. The Vertical Fork and Vertical Join elements 1135, designated by the same graphical symbol in view 1100, manage concurrent processing in an activity diagram 1110. The Vertical Fork is used to split a diagram's flow into concurrent flows. The Vertical Join synchronizes incoming concurrent flows. The DDS Publisher element 1140 publishes a message to a DDS topic on a network as part of a reactive scenario. The DDS Receiver element 1145 is used by the IBS 520 to subscribe to messages received on a DDS topic on the network 430. These elements are easily extensible to middleware communications standards other than DDS 1140.

The Set Shared Variable element 1150 enables an operator to set the value of a shared variable during a scenario. The data types of shared variables may include integers, floating point, Boolean, enumerations, and obvious extensions. Expressions to set shared variables are constructed using the EEE 830. The Message Map element 1155 transforms an incoming (received) message into an outgoing message (often a completely different message) and sets the field values in the outgoing message. Complex expressions for a Message Map 1155 are constructed using the EEE 830.

The Filter element 1160 checks an operator-specified condition and sends a copy of incoming messages that pass this condition to subsequent reactive scenario elements for processing. Thus, the Filter element 1160 can filter out messages that the operator does not desire to process, and only process messages that pass the Filter element 1160. The Re-sequencer element 1165 rearranges the order of messages based on the order in which they were received. Message timeout and queue capacity can be specified by an operator. The Initial element 1170 designates the start of a reactive scenario as defined in an activity diagram 1110. The Timer element 1175 may be used to start, cancel, and send a message upon expiration of an operator-defined timer.

Figure 12:
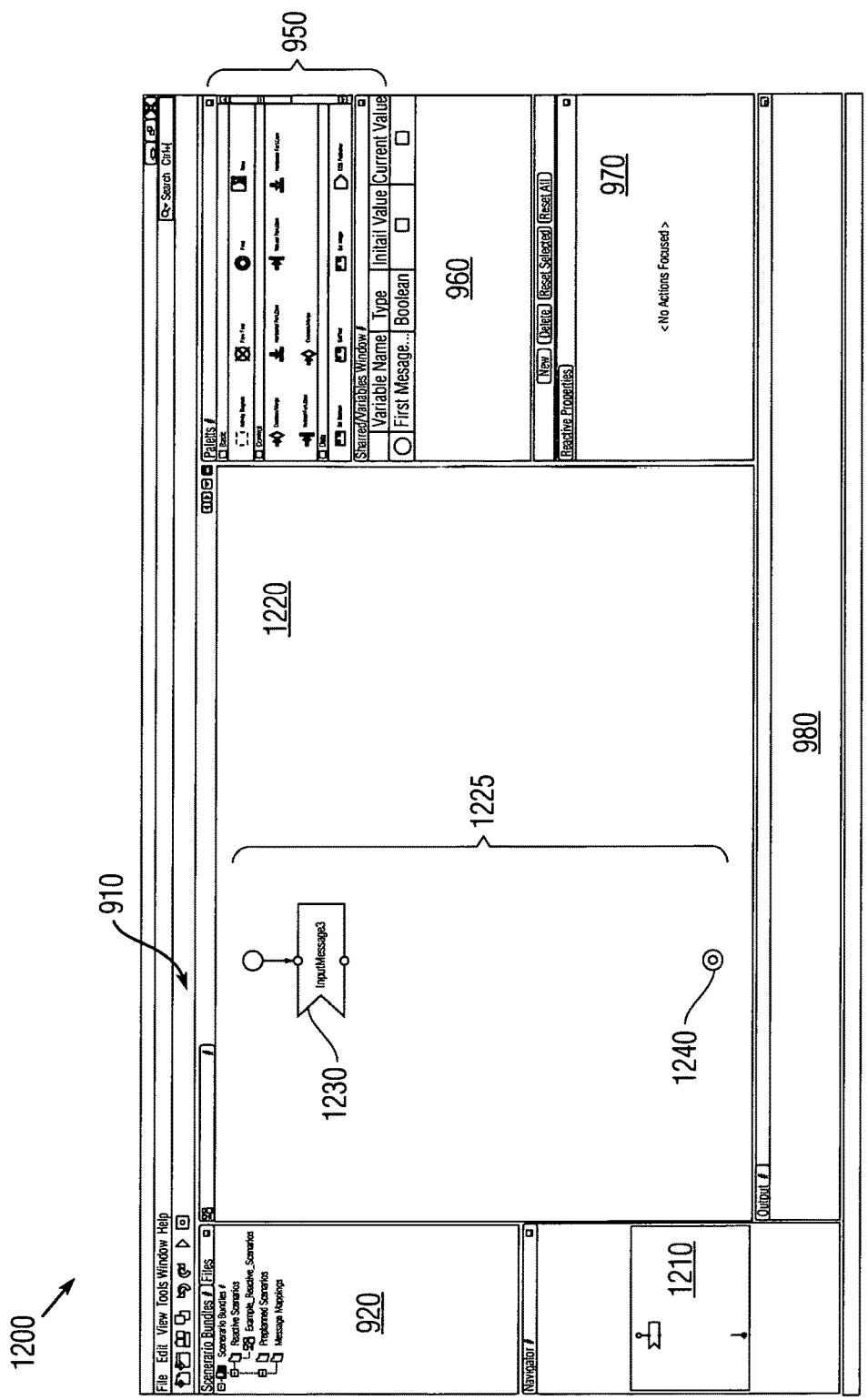
FIG. 12 is a screen view of an Initial New Scenario Display.

FIG. 12 shows an Initial New Scenario Display in screen view 1200 after an operator initiates its creation. The operator is automatically presented with a DDS Receiver element 1145 (represented as a UML signal symbol) and a Final element 1115. These elements are shown as box 1230 and node 1240, as the operator has yet to specify an input message for the reactive scenario to process and since the elements are not connected. The ADE 820 uses such automatic error checking to visually cue an operator to take actions to complete or correct aspects of a reactive scenario.

Figure 13:
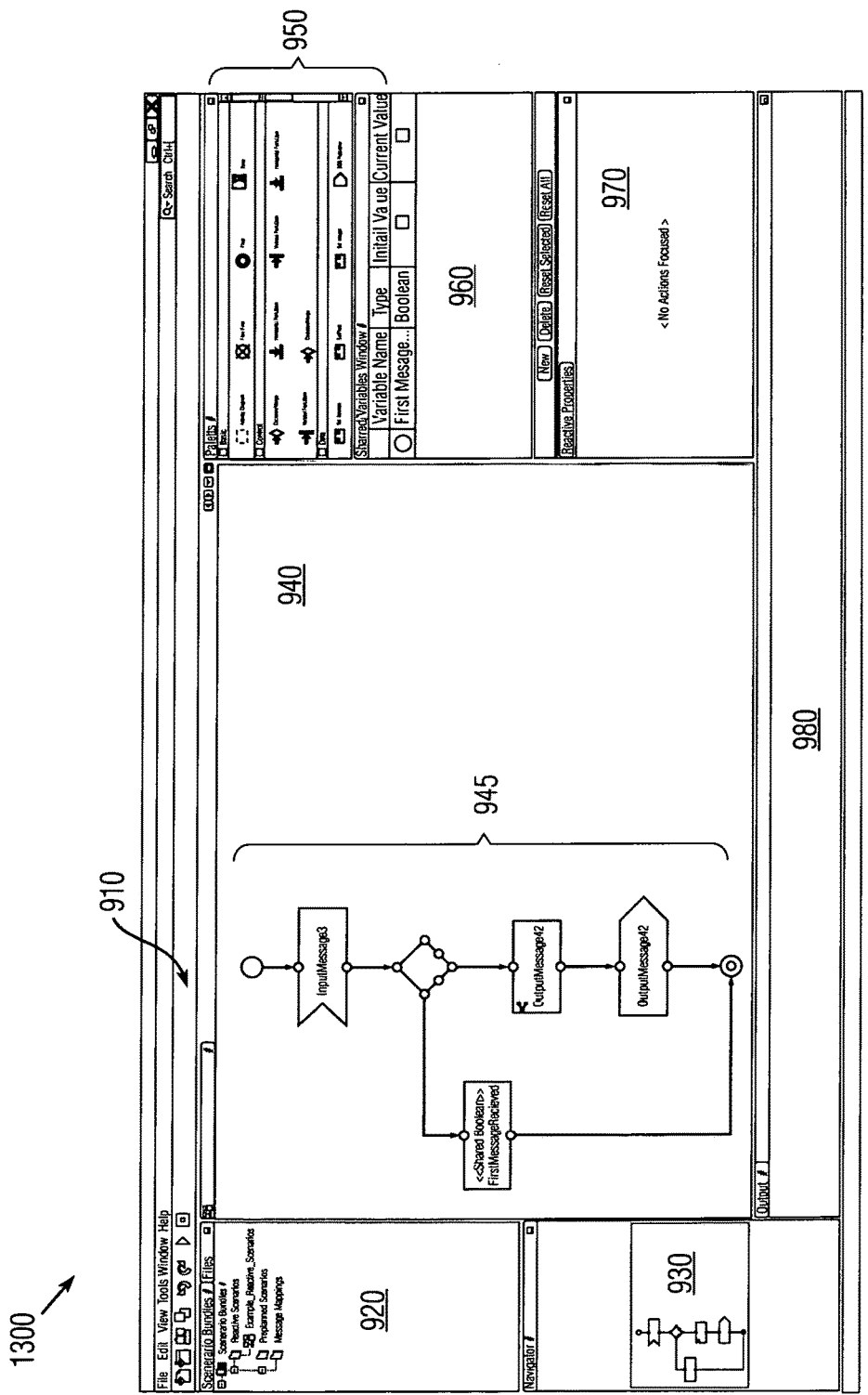
FIG. 13 is a screen view of a Completed Reactive Scenario.
Figure 14:
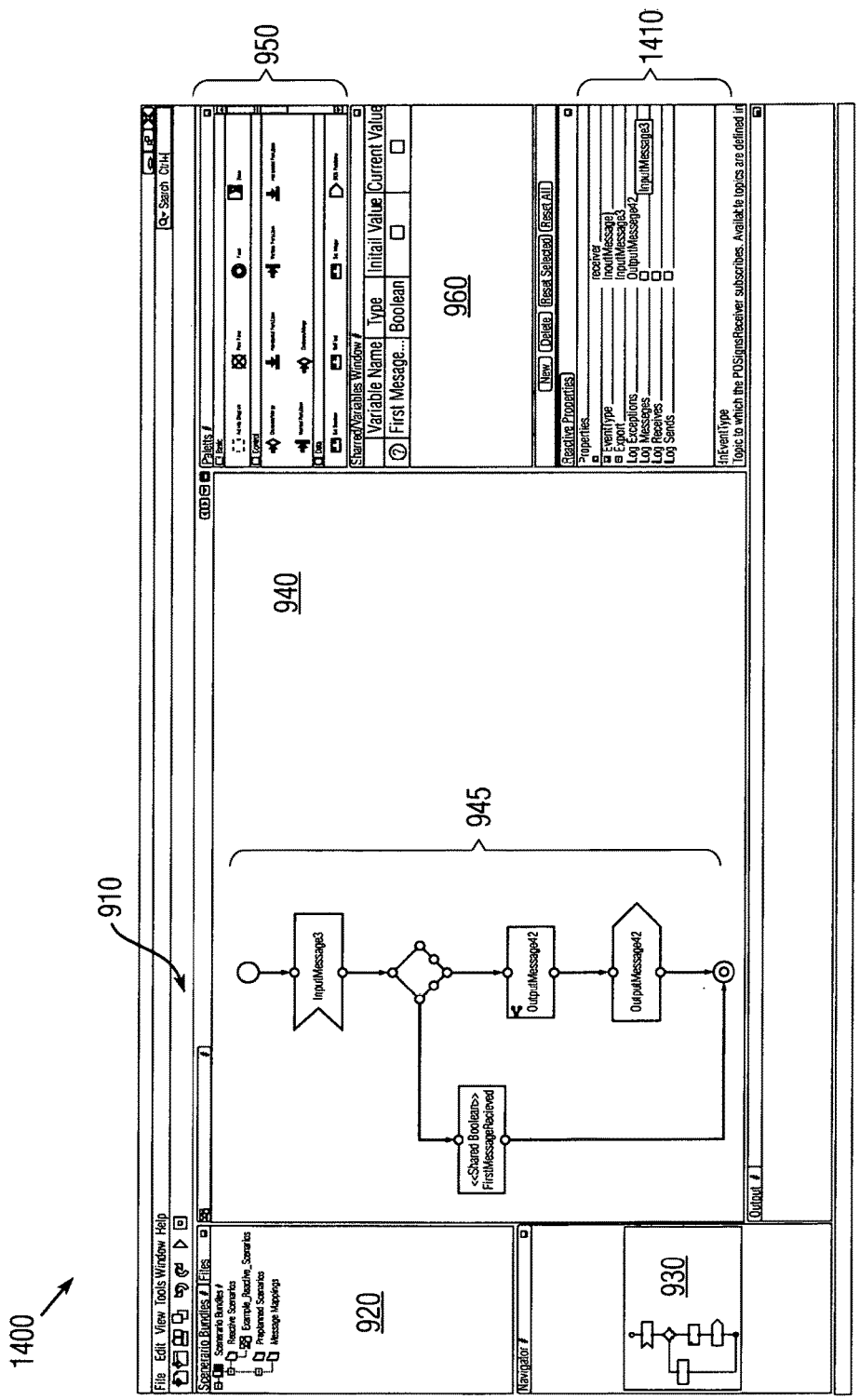
FIG. 14 is a screen view of Reactive Properties of a Receiver element.

FIG. 13 shows an example Completed Reactive Scenario in screen view 1300, similar to the view 900 of the ADE 820. The screen view 1300 illustrates the appearance of the windows for a completed reactive simulation. FIG. 14 shows in screen view 1400 an example of Reactive Properties 1410 for a DDS Receiver element 1145. The reactive properties 1410 of the DDS Receiver element 1145 provide an example of the reactive properties for a reactive scenario in an exemplary embodiment. The operator specifies the element's input event type by selecting a message to be processed by the reactive scenario.

Figure 15:
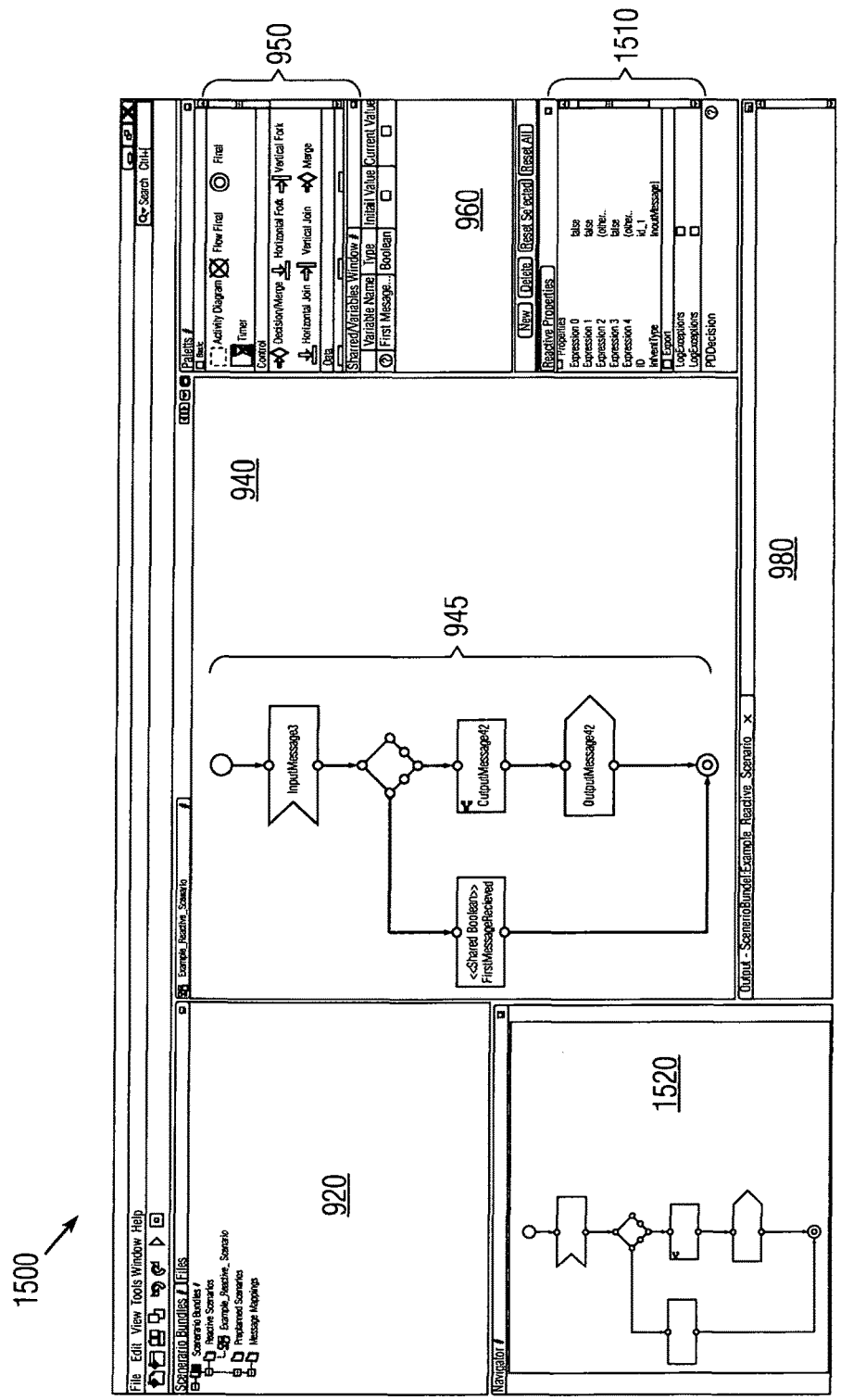
FIG. 15 is a screen view of Reactive Properties of a Decision element.
Figure 16:
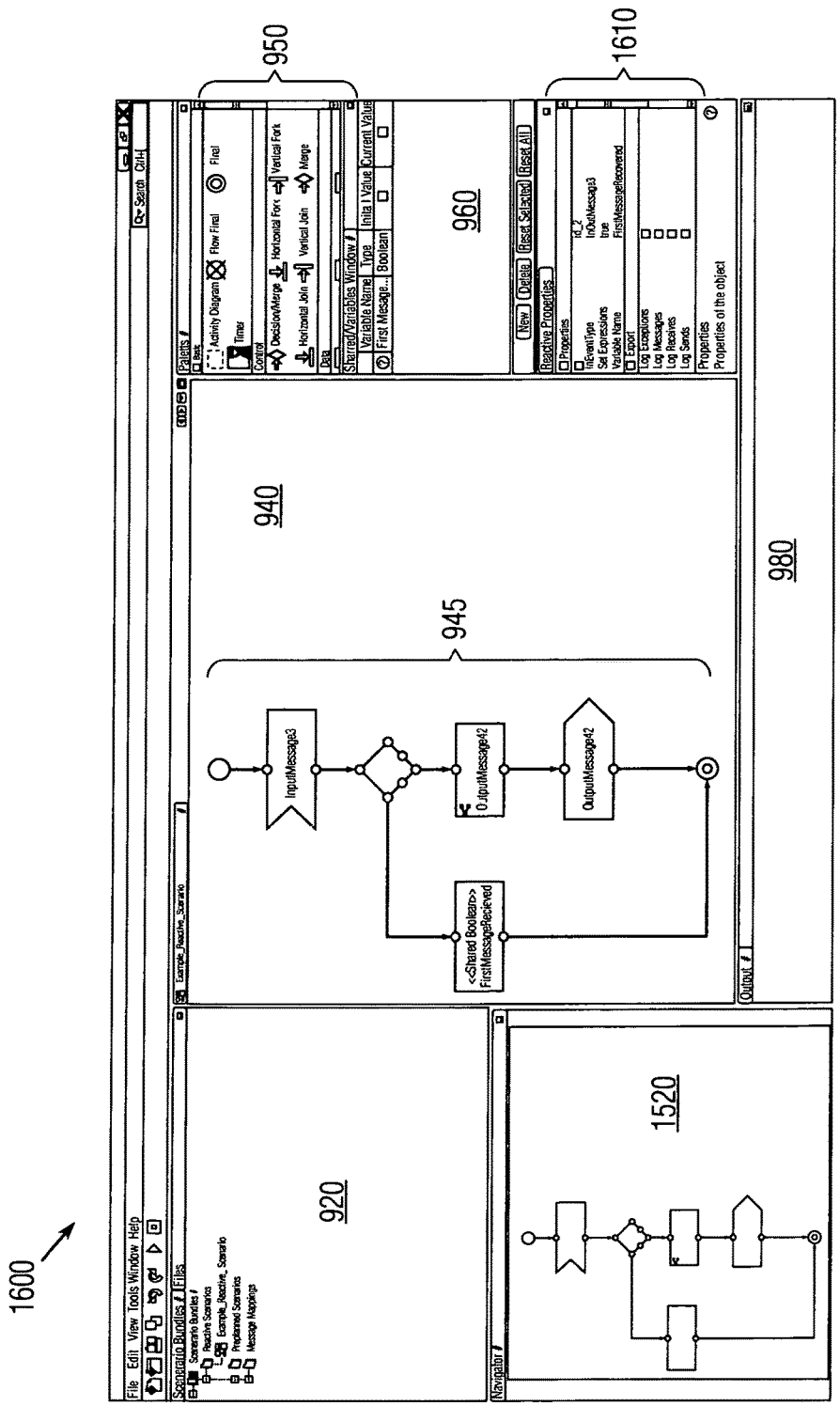
FIG. 16 is a screen view of Reactive Properties of a Set Shared Variable element.

FIG. 15 shows in screen view 1500 an example of Reactive Properties 1510 for an example Decision element 1030 of reactive properties in an exemplary embodiment. Also the navigation panel 930 is shown enlarged as navigation panel 1520. The operator specifies logical expressions, using the EEE 830, associated with the Decision element 1030. FIG. 16 shows in screen view 1600 an example of Reactive Properties 1610 for a Set Shared Variable element 1150. The reactive properties 1610 of a Set Shared Variable (Boolean) element 1150 provide example reactive properties for such an element. An operator specifies a Boolean expression to determine the value to which the shared variable is to be set during execution by using the EEE 830.

Figure 17:
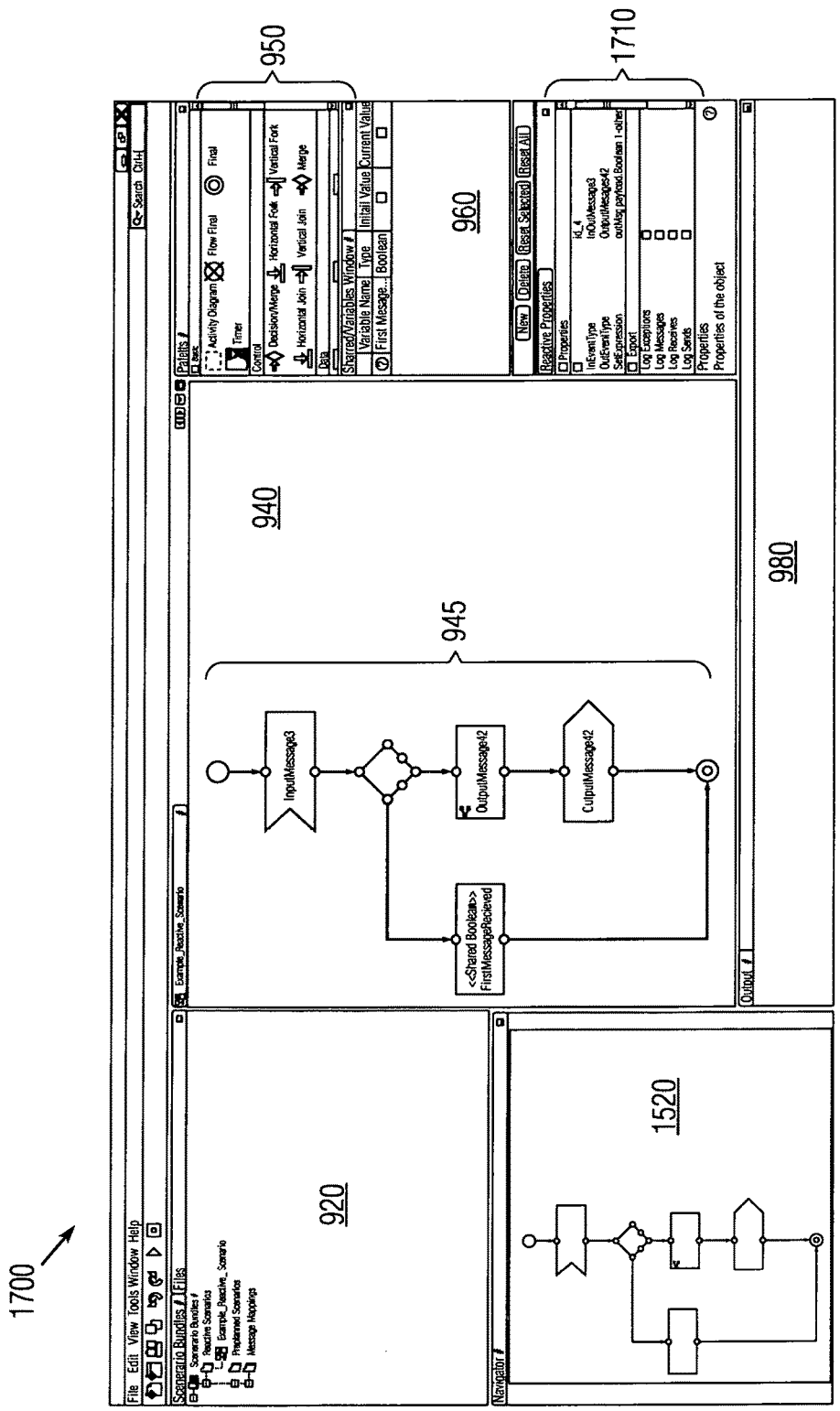
FIG. 17 is a screen view of Reactive Properties of a Message Map element.

FIG. 17 shows in screen view 1700 of Reactive Properties 1710 for a Message Map element 1155. The reactive properties 1710 of the Message Map element 1155 provide an example of reactive properties for such an element. An operator specifies the outgoing message that the Message Map element 1155 will produce at least one embedded expression using the EEE 830.

Figure 18:
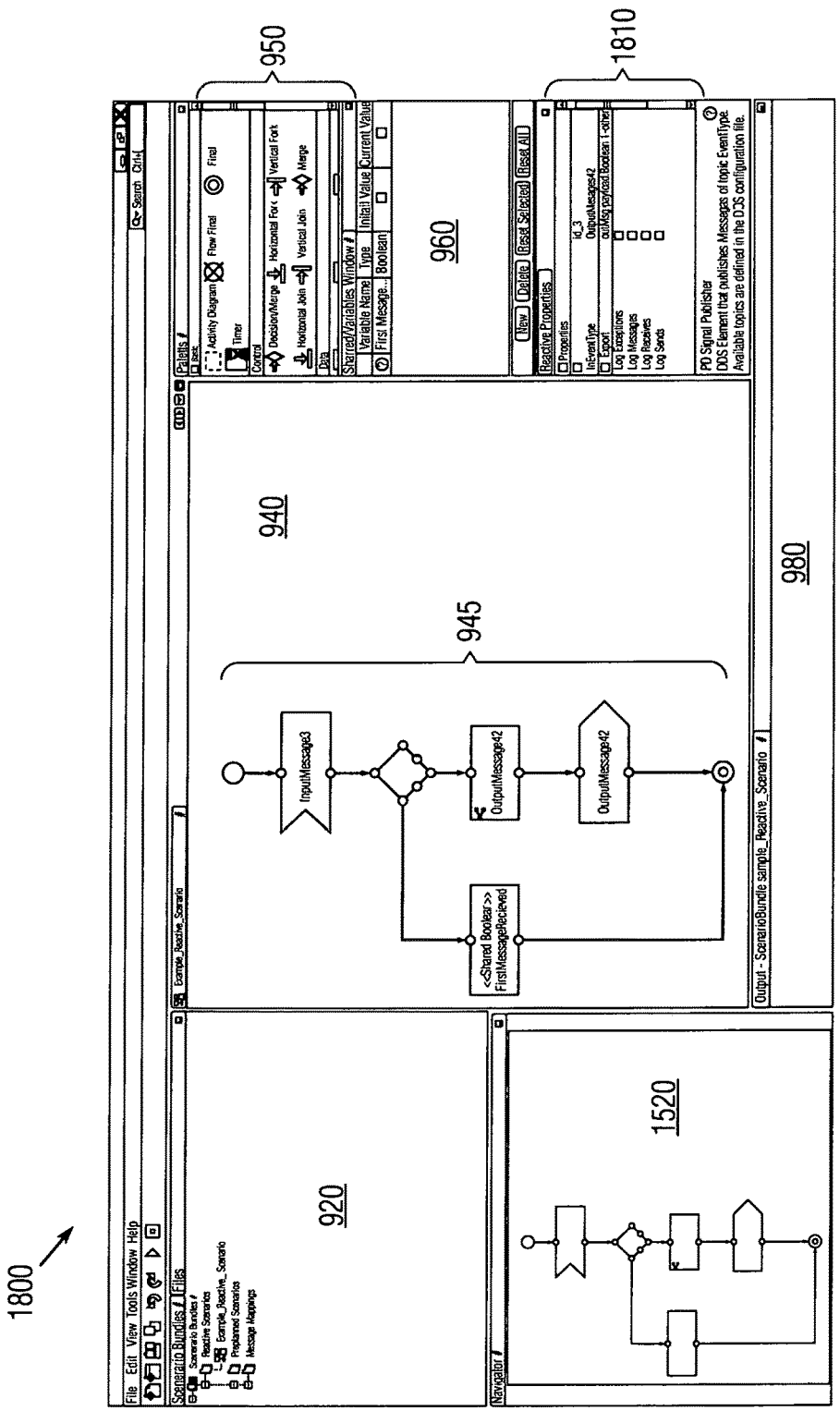
FIG. 18 is a screen view of Reactive Properties of a Publisher Element.

FIG. 18 shows in screen view 1800 of Reactive Properties 1810 for a DDS Publisher element 1140. The reactive properties 1810 of the DDS Publisher element 1140 provide an example of reactive properties for such an element. The EEE 830 enables an operator to readily and quickly create, modify, and delete embedded expressions for Decision, Set Shared Variable, and Message Map scenario elements 1125, 1150 and 1155 in a highly graphical, easy-to-use manner. The EEE 830 uses a single display for specifying logical expressions for the Decision and Set Shared Variable elements 1125 and 1150.

Figure 19:
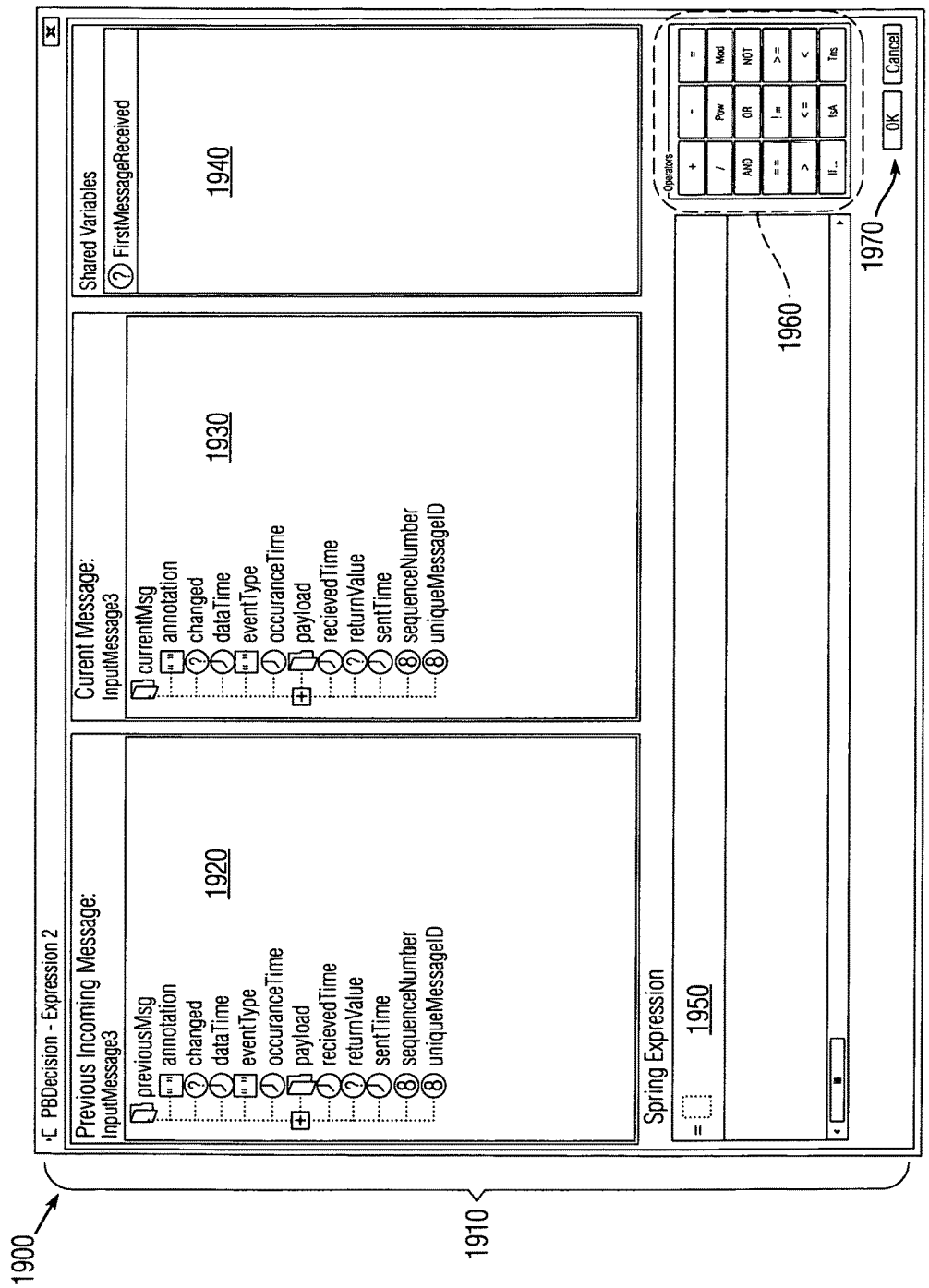
FIG. 19 is a screen view of a Drag-and-Drop Embedded Expression Editor for a Decision element.

FIG. 19 shows a screen view 1900 of an EEE display 1910 for a Decision element. Windows are shown for Previous Incoming Messages 1920, Current Incoming Messages 1930, Shared Variables 1940, Spring Expression area 1950, Operator Keypad 1960 and selection options 1970. Different and expanded screen layouts of the EEE display 1910 for a Decision element are possible without departing from the scope of the invention.

The Spring Expression area 1950 at the bottom portion of this display 1910 represents an area into which the operator can drag and drop various components of a logical expression. The structure of a previously-received incoming message 1920 is shown in the upper left portion. An operator can use this portion of the display 1910 to explore and access the structure and fields of a previously-received incoming message 1920. This is useful, for example, so that an operator can build logical expressions that detect changes between a previously-received incoming message 1920 and the current incoming message 1930 being processed by the reactive scenario.

Similarly, the upper center section of the display 1910 enables an operator to explore and access the structure and fields of the current incoming message 1930. The upper right section of the display 1910 enables an operator to access shared variables for use in logical expressions. The Operator Keypad 1960 in the lower right portion of the display enables an operator to use any number of predefined operations in logical expressions for a reactive scenario.

Figure 20:
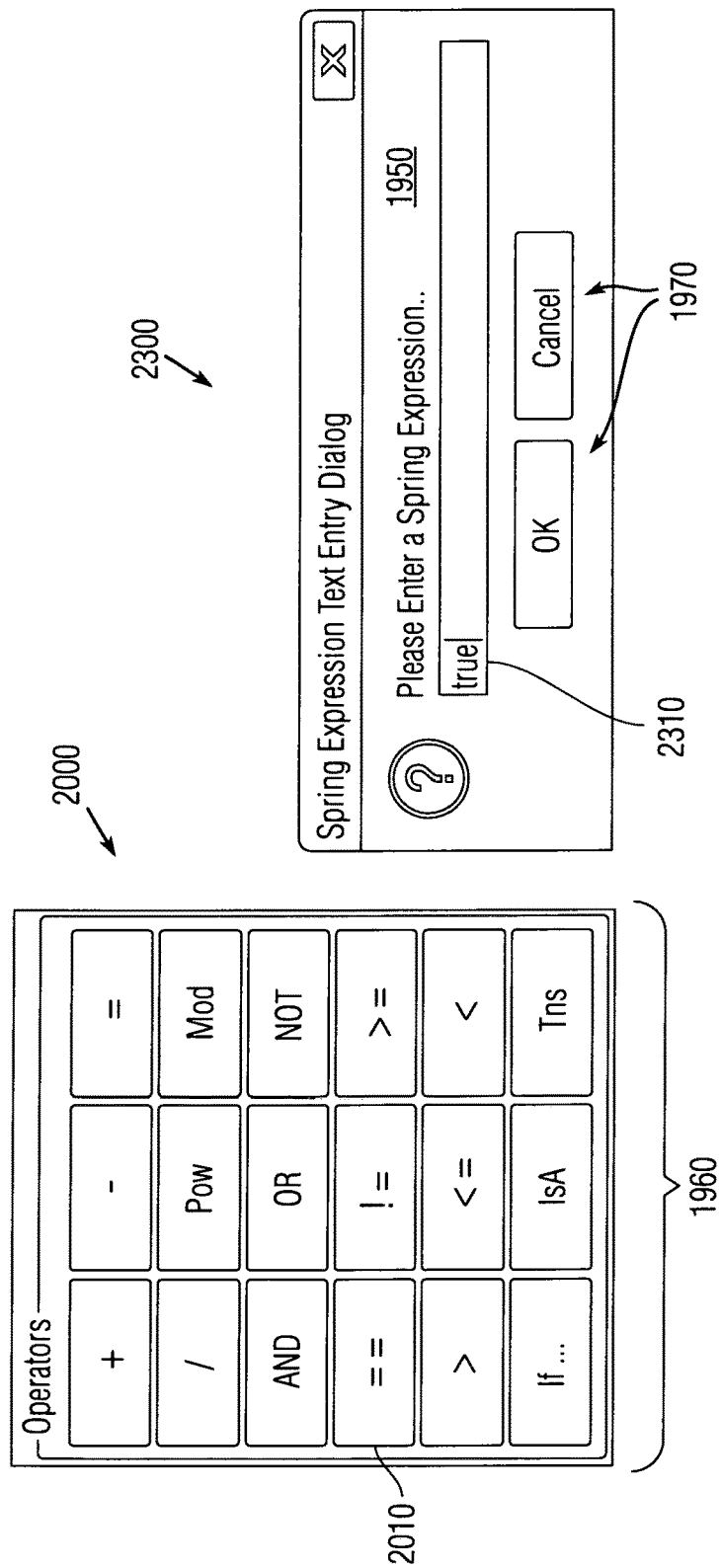
FIG. 20 is an icon view of an Operator Keypad for expressions.

FIG. 20 shows a screen view 2000 of an example Operator Keypad 1960 for use in embedded expressions. In the embodiment illustrated, the following operators may be used in constructing logical expressions: addition, subtraction, multiplication, division, raising a number to a power, modulo, logical AND, logical OR, logical NOT, comparator (equality) 2010, inequality, greater than or equal to, greater than, less than or equal to, less than, condition testing (if . . . then . . . else), datatype checking ("is a"), and current system time (e.g., in nanoseconds). In other embodiments, the Operator Keypad 1960 may include any number of logical, mathematical, and specialized operators useful in building embedded expressions for reactive scenarios.

In the EEE 830 for a Decision element, an operator can drag and drop previous incoming message fields, current incoming message fields, shared variables, and operators to the expression portion of the display to build logical expressions. In addition, an operator can enter fixed values or user-defined expressions in textual form for part of a logical expression. Exemplary embodiments maintain three corresponding representations of a logical expression created in the EEE 830: a display representation, an evaluation representation, and a scenario representation. During and subsequent to expression construction, these three representations are automatically maintained and kept accurate by the IBS 520. The display representation enables displaying an expression in the EEE 830. The evaluation expression stores an expression in an abstract syntax tree structure tailored for the IBS 520.

This representation is used for rapid evaluation of the logical correctness of an expression. Lastly, the scenario representation stores the expression in a format that is compatible with use in modifying and executing the expression in the context of a reactive scenario. Exemplary embodiments employ the Spring Expression Language (SpEL) to represent the underlying logical expressions. Use of alternative languages to represent logical expressions is also possible.

Figure 21:
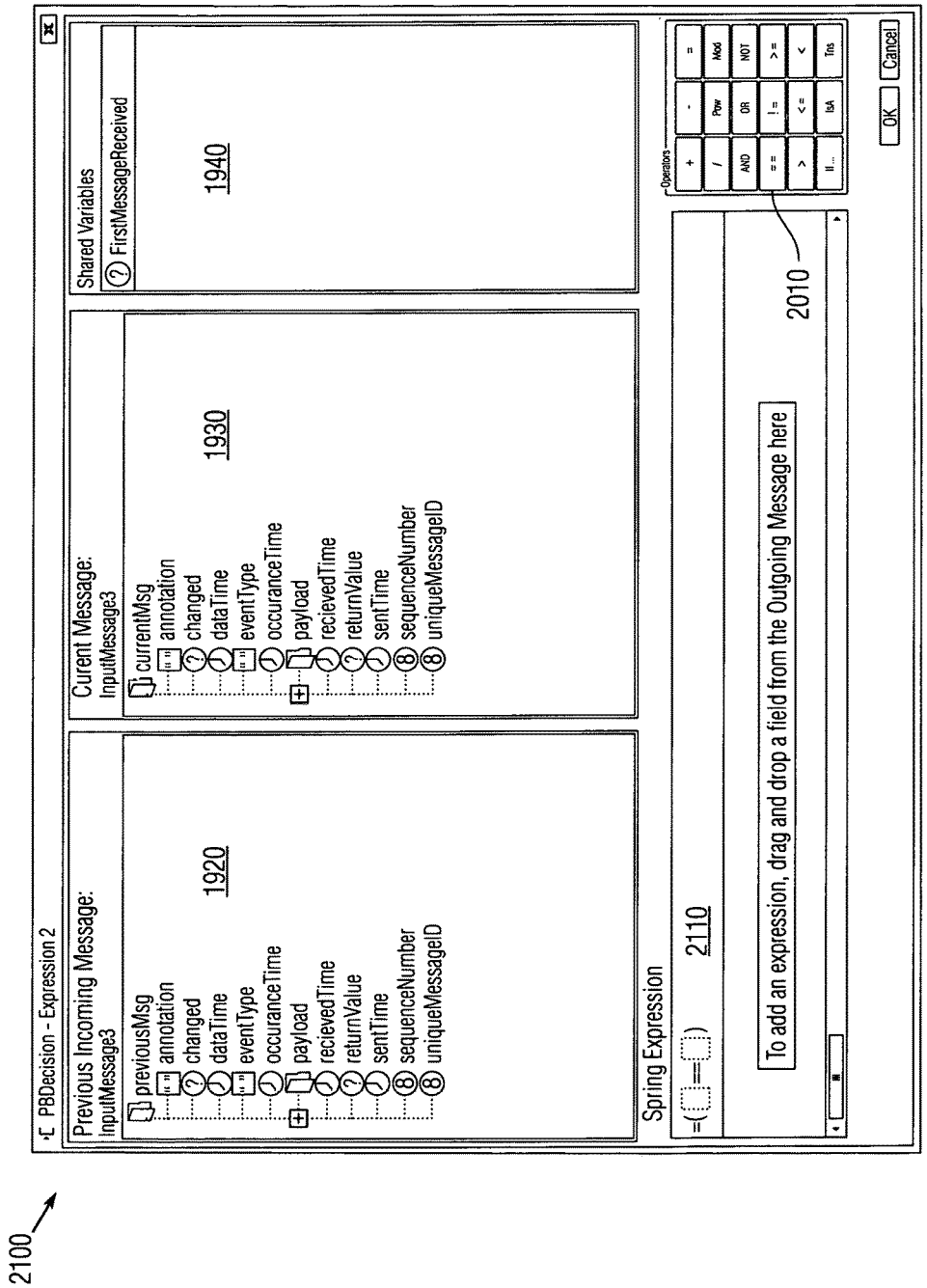
FIG. 21 is a screen view of a Comparator Operator used in an Example Expression.
Figure 22:
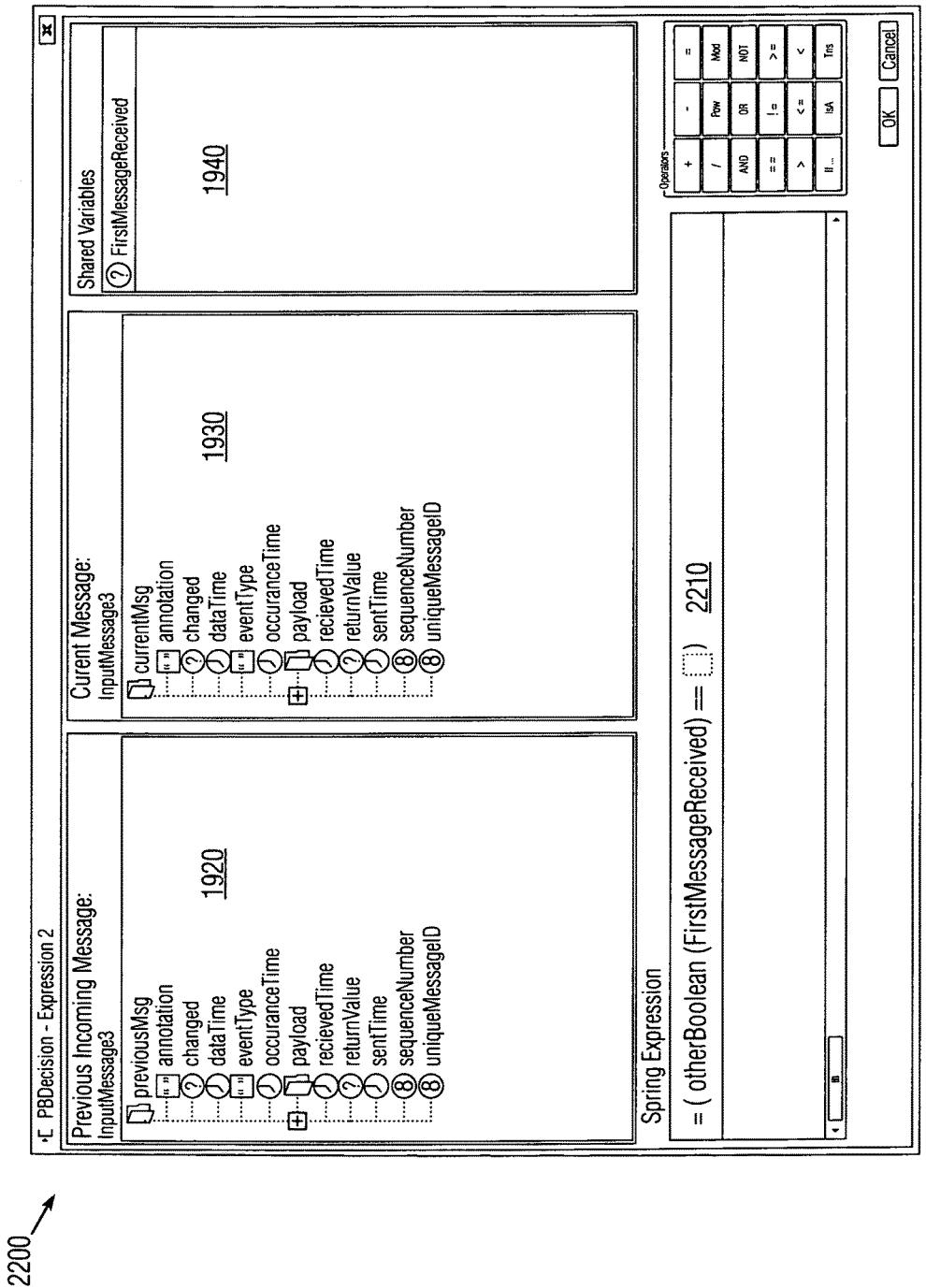
FIG. 22 is a screen view of an Embedded Expression Editor for a Shared Variable.
Figure 24:
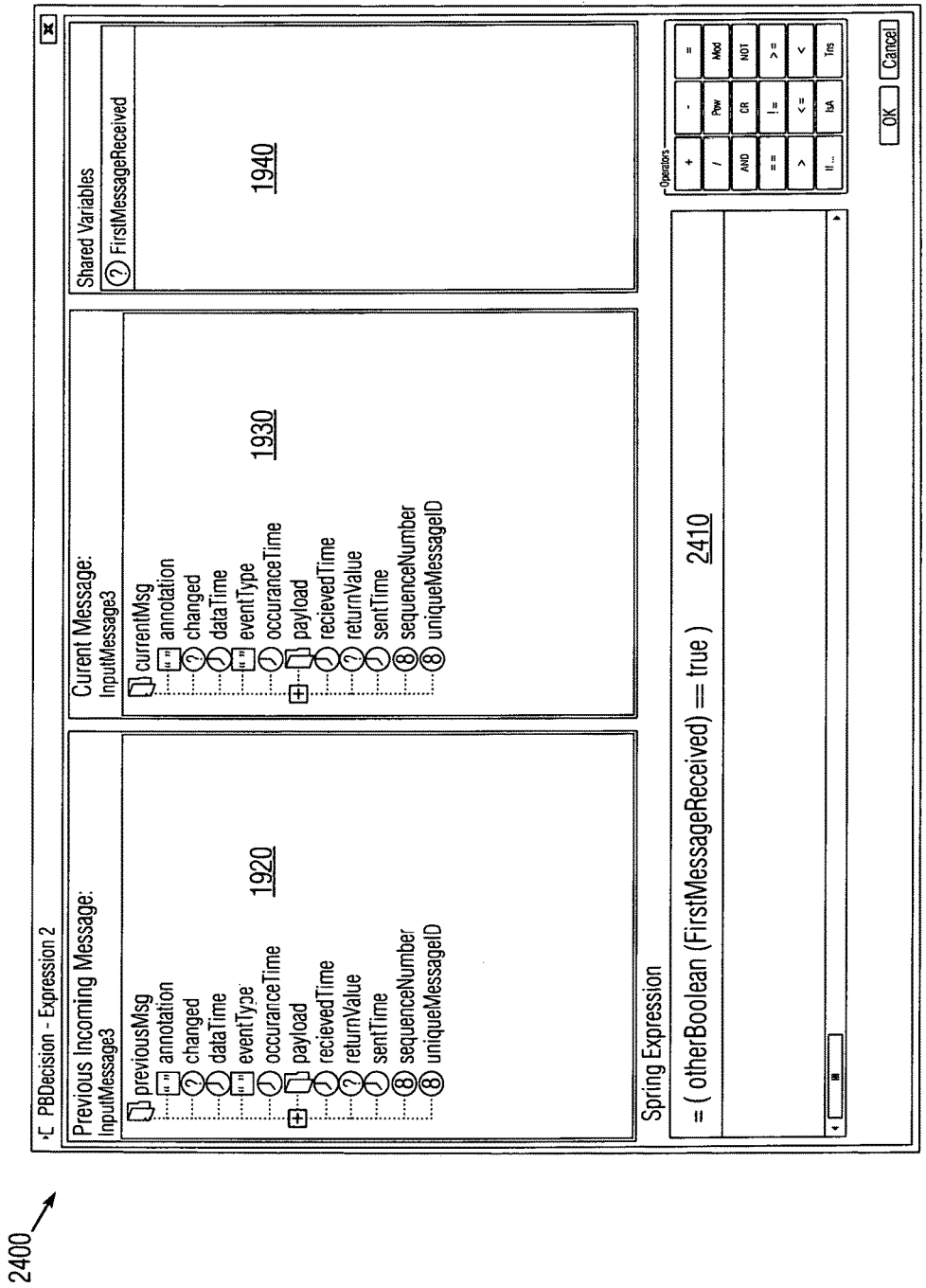
FIG. 24 is a screen view of a completed logical expression using a Fixed Value for a Decision element.

FIG. 21 shows a screen view 2100 of an Example Expression 2110 after the operator has dragged and dropped a Comparator Operator to the expression portion of the display. The Operator Keypad 1960 includes the comparator operator 2010. FIG. 22 shows a screen view 2200 of an example display after the operator has subsequently dragged and dropped a shared variable to the Example Expression 2210. FIG. 23 shows a screen view 2300 of a completed expression example dialog display when the operator desires to enter a Text Entry Expression 2310. FIG. 24 shows a screen view 2400 of an example of a completed logical expression using a Fixed Value for a Decision element in an Example Expression 2410.

Figure 25:
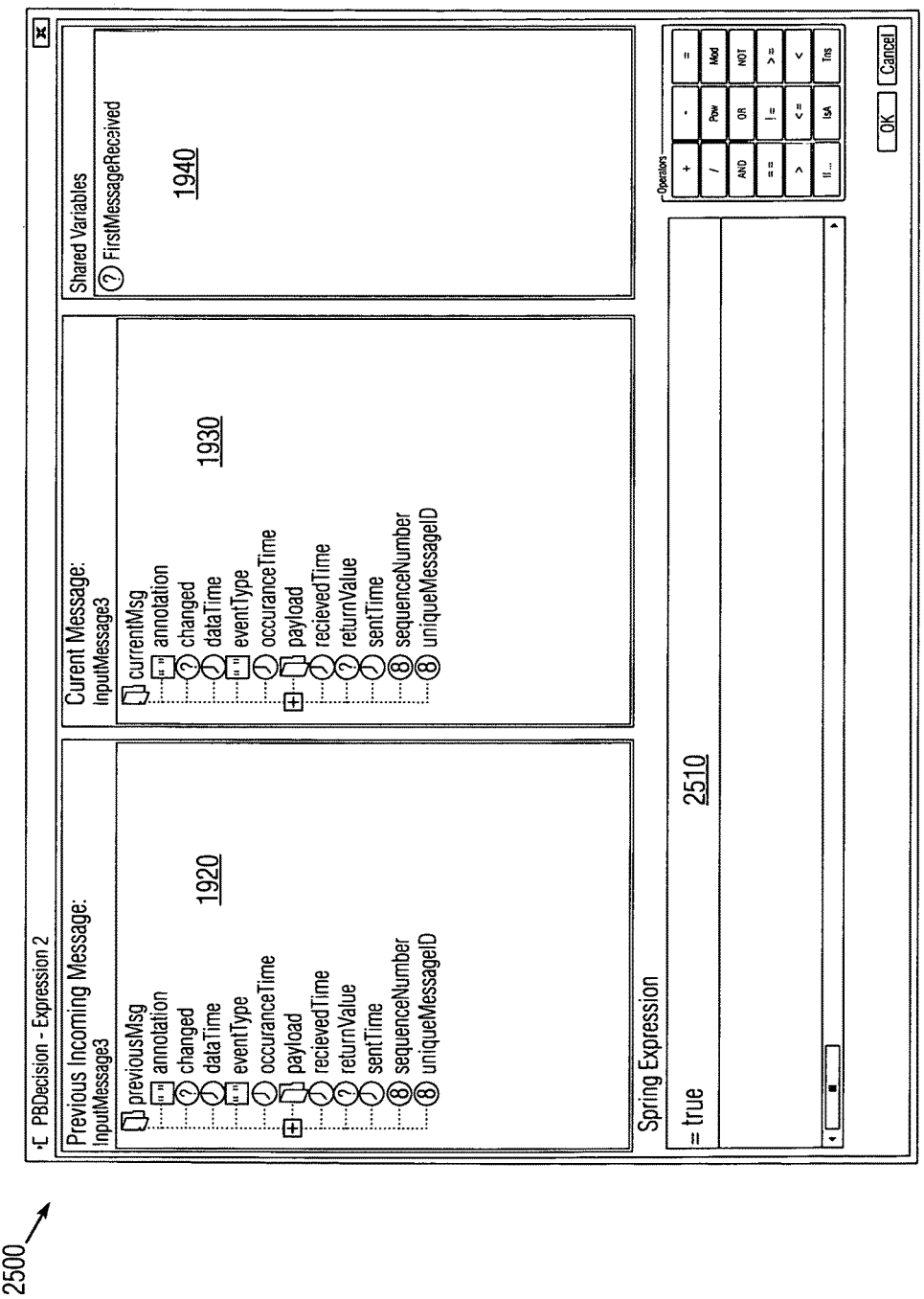
FIG. 25 is a screen view of an Embedded Expression Editor for a Set Shared Variable element.

FIG. 25 shows a screen view 2500 of the EEE display 2510 for a Set Shared Variable element 1150 in exemplary embodiments. In this configuration, the screen layout is the same as the screen layout for a Decision element. Similar to view 1900, an operator can drag and drop previous incoming message fields 1920, current incoming message fields 1930, shared variables 1940, and operators to the expression portion of the display 2510 to build expressions. In addition, an operator can enter fixed values or user-defined expressions in textual form for part of a logical expression. This form of the EEE 830 can be used to create an expression used to set the value of a selected shared variable using reactive properties 1610. Different and expanded screen layouts are possible in other embodiments.

Figure 26:
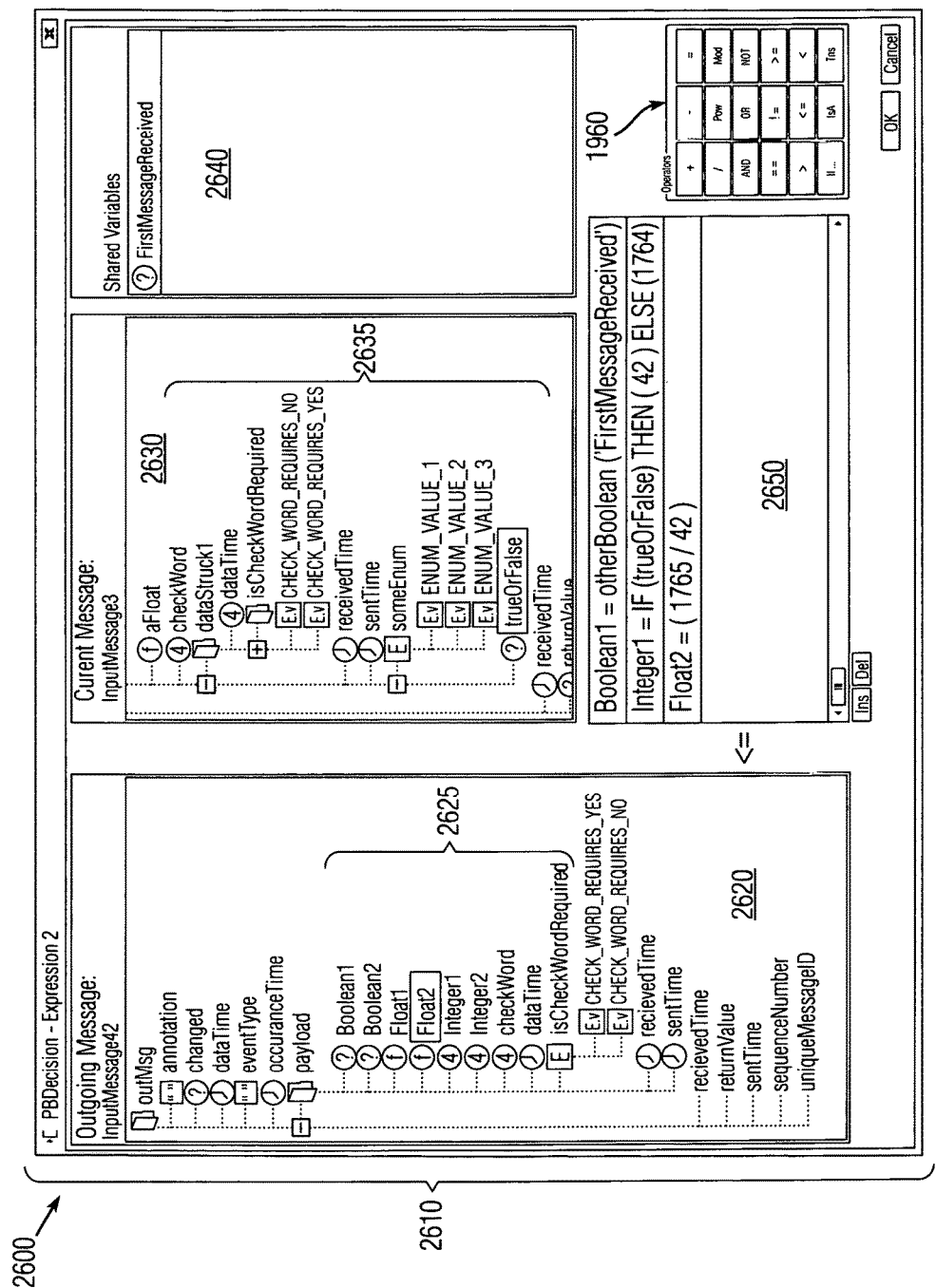
FIG. 26 is a screen view of a Drag-and-Drop Embedded Expression Editor for a Message Map element.

FIG. 26 shows a screen view 2600 of the EEE display 2610 for a Message Map element 1155. Windows are shown for the Outgoing Messages 2620 on the left side with outgoing message fields 2625, Current Incoming Messages 2630 in the upper center with incoming message fields 2635, Shared Variables 2640, Spring Expression 2650 on the lower center and Operator Keypad 1960 with screen selection. In this configuration, an operator can explore an outgoing message's structure and fields, and select a field to set its value using a logical expression. An operator can drag and drop incoming message fields, shared variables, and operators to the expression portion of the display 2610 to build expressions. In addition, an operator can enter fixed values or user-defined expressions in textual form for part of a logical expression. In other embodiments, the operator may also use fields of a previously-received message in logical expressions for the Message Map element 1155.

This form of the EEE 830 can be used to create an expression whose value is used as the value of an outgoing message field. FIG. 26 also provides an example of a completed expression for a Message Map element 1155, shown in the expression portion of the display. Different and expanded screen layouts are possible in other embodiments.

Figure 27:
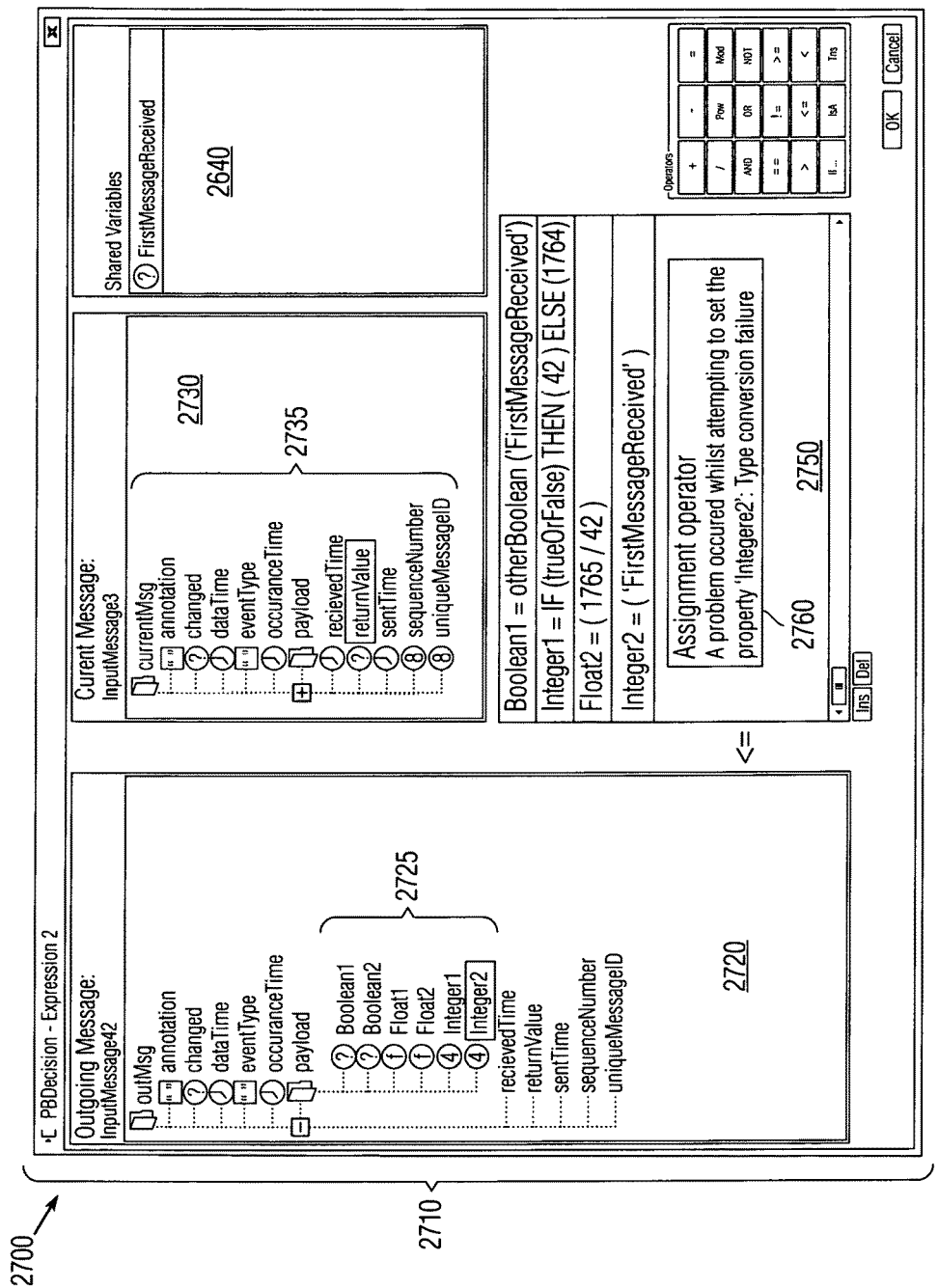
FIG. 27 is a screen view of an Error Message element in the Embedded Expression Editor.

An operator can create as many expressions for outgoing message fields as desired. When no expression is created for an outgoing message field, the IBS 520 employs a default value. This enables the operator to only create expressions for fields for which they desire other than default values. FIG. 27 shows a screen view 2700 of the EEE display 2710 for an example Error Message in an EEE 830. Error messages cue an operator to a problem with a logical expression being built. Error checking and user feedback applies to EEE 830 displays for Decision, Set Shared Variable, and Message Map elements 1125, 1150 and 1155.

Reactive Simulation Information Representation can be exemplified by FIG. 28, which shows a list view 2800 of code instruction in an XML format. The XML File Repository 740 uses a unique XML-based format to represent reactive logic definitions for interface behavior simulations. The format is an extension of the Spring Framework's spring-beans and Akka actor model-based XML schemas. The format is specified in a namespace and XML schema section 2810. The root of element hierarchy 2815 defines the top of the hierarchy of information specific to a Reactive Scenario.

A hierarchical UML element section 2820 includes (for each UML element) a unique element name 2825, hierarchy dependency information 2830, UML element properties 2835, Java class name 2840, screen coordinates of elements 2845, and embedded expressions 2850. A specification of connections between UML elements section 2860 includes connection mechanism 2865, identification of source from an element 2870, port number from an element 2875 and identification of recipient of an element 2880. The format comprises three sections: namespace and XML schema setup 2810, hierarchical UML element definitions 2820, and specification of connections between UML elements 2860. The format represents the information required to view, modify, and execute reactive scenarios. The execution information is mapped to an actor-based Reactive Logic Network (RLN) 725, part of the HPRSE 720 (discussed herein).

The namespace and XML schema setup section 2810 provides references to define the structure of the rest of the XML format. Each reactive scenario has a designated top-level activity diagram. A top-level activity diagram may have an arbitrary number of sub-activity diagrams embedded therein. Each UML element of a reactive scenario is defined in the hierarchical UML element definition section 2820 of the XML format, which starts by defining the root element (top) of the actor hierarchy 2815. This specifies the unique element name 2825 that identifies each UML element, specifies information about dependencies on the actor hierarchy 2830, defines properties of the UML element 2835, and provides the name of the Java class that implements the element 2840. In addition, the hierarchical section specifies the screen display coordinates of the element 2845. Lastly, this section encodes embedded expressions associated with the element 2850. The UML element connection section 2860 of the XML format specifies connections between UML elements.

This includes the name of the object class used by the actor-based reactive simulation engine to set up the connections 2865 as the connector mechanism, the identifier of the UML element from which the connection originates 2870, and the identifier of the UML element to which the connection goes 2880.

Figure 29:
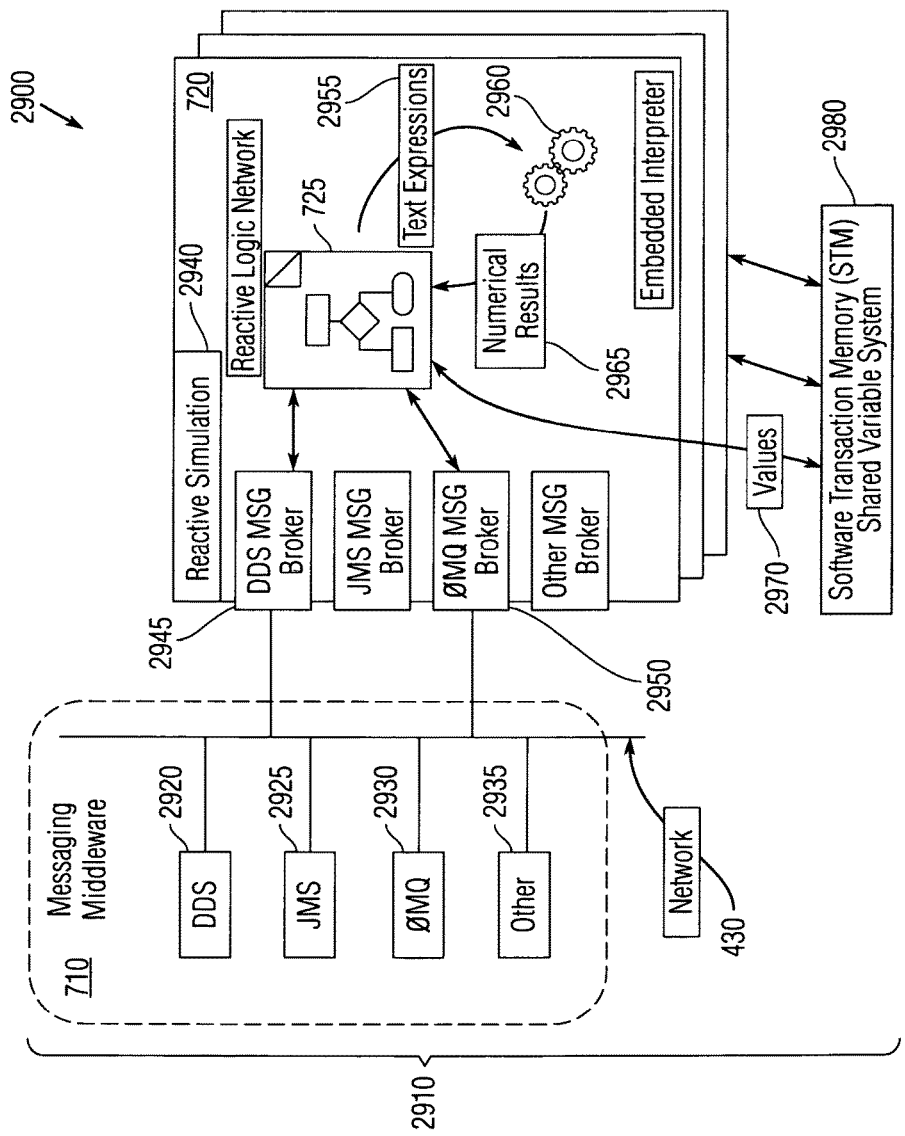
FIG. 29 is an operation view of an architecture for a High-Performance Reactive Simulation Environment.

FIG. 29 depicts an operation view 2900 of the High-Performance Reactive Simulation Environment (HPRSE) 720 as a detail from architecture view 700. The messaging middleware 710 includes standards for messages communicated using the network 430, such as the DDS 2920, JMS 2925, ZeroMQ (ØMQ) 2930 and other 2935. The HPRSE 720 includes modules for reactive simulation 2940, a DDS message broker 2945 that connects to the network 430, a ZeroMQ message broker 2950 (implementation anticipated), the RLN 725, a text expression 2955 that encodes information sent to an embedded interpreter 2960, which sends numerical results 2965 to the RLN 725, which also produces values 2970 for exchange. A software transactional memory (STM) of the SVS 2980 communicates with one or more instances of the RLN 725 contained in the HPRSE 720.

During execution of a reactive scenario, the RLN 725 subscribes to the input messages encoded in the previously-mentioned XML scenario format. The subscription process is performed by a Message Broker, e.g., 2945 and 2950, associated with the middleware communications standard specified in the XML scenario format. As the messages are received by the Message Broker, they are processed by the RLN 725 that subscribed to them. The RLN 725 sends text-based expressions 2955 from the scenario to the Embedded Interpreter 2960, which evaluates the expressions and returns the results.

The SVS 2980 dynamically manages variables shared across reactive scenarios being executed, updating variables as scenarios change them during execution and providing shared variable values 2970 as the executing scenarios require them to execute their logic. The IBS SVS 2980 uses STM techniques to provide safe concurrent access to shared variables by reactive scenarios. The RLN 725 determines that a scenario needs to publish messages on the network 430, thereby communicates with one or more Message Brokers. The Message Brokers, e.g., 2945 and 2950, then publish the messages on the network 430 using the appropriate middleware connection standards, such as DDS 2920, JMS 2925, or ZeroMQ 2930.

Figure 30:
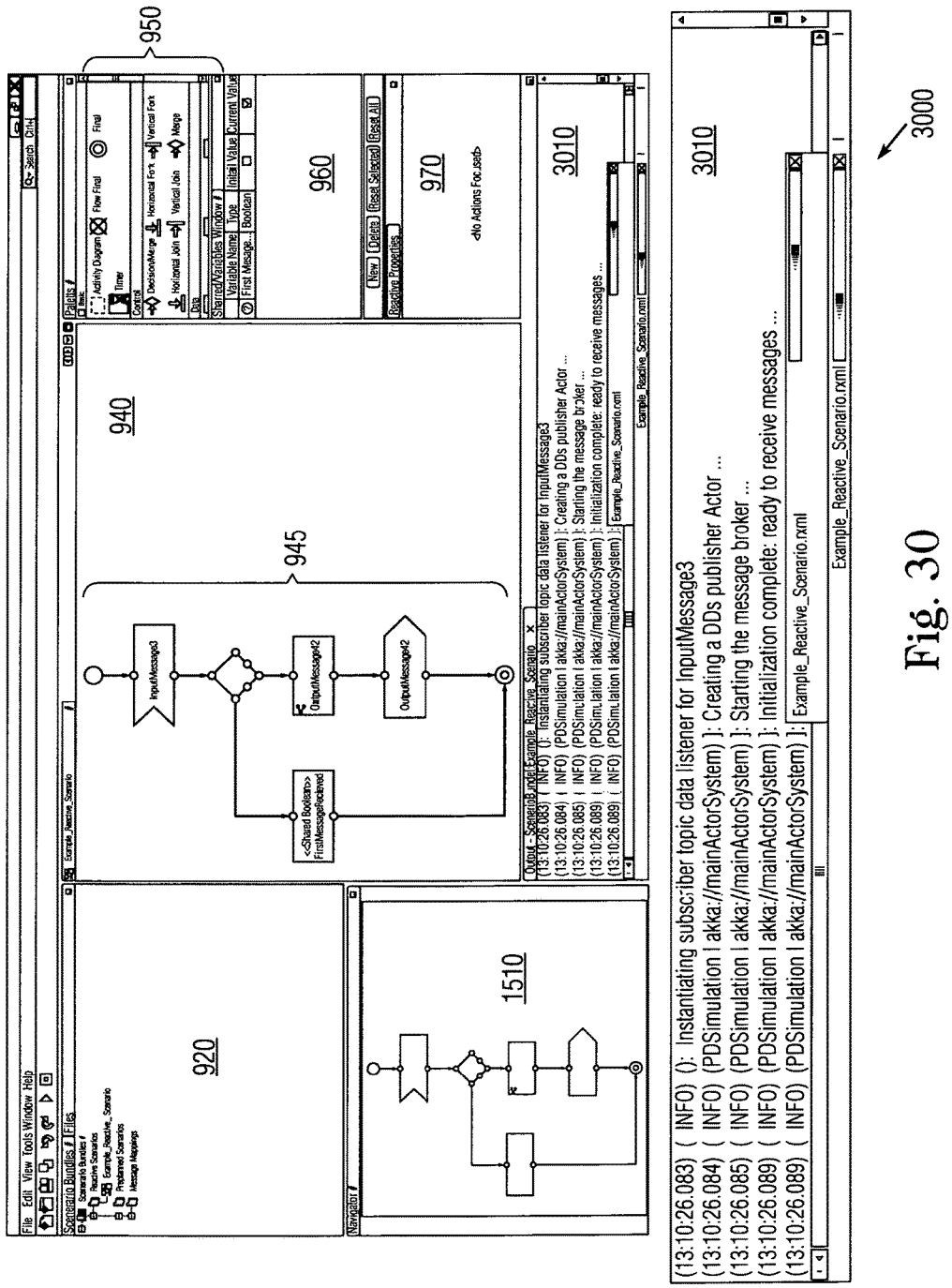
FIG. 30 is a screen view of a Reactive Scenario under execution.
Figure 31:
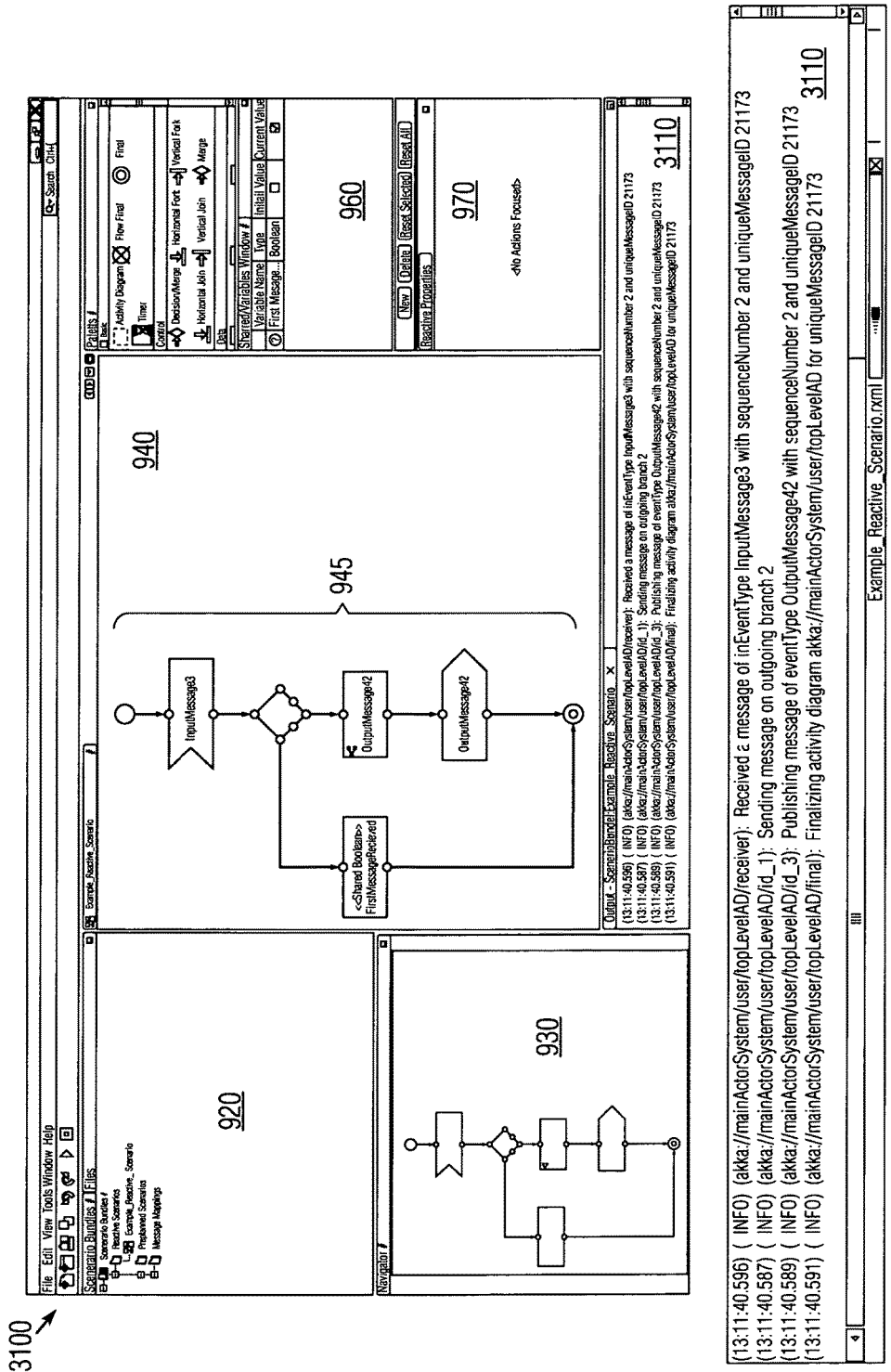
FIG. 31 is a screen view of Status Information during Reactive Scenario execution.

An operator may execute one or more reactive scenarios, in combination with at least one preplanned (scheduled) scenario, which together constitute a simulation of a particular set of interface behaviors. FIG. 30 shows a screen view 3000 of Reactive Scenario execution. In this embodiment, an Output display area 3010 at the bottom right portion displays the scenarios currently for an example Reactive Scenario being executed. The Output portion of the display provides indications of the progress in executing simulations, as well as an indication of any errors encountered. Similarly, FIG. 31 shows a screen view 3100 example Status Information Reactive Scenario execution. An Output portion display area 3110 at the bottom right portion displays the scenarios currently being executed. This Output portion 3110 indicates what messages have been received, which branches of the activity diagram a simulation has taken (based on the input message), and what messages have been published by the IBS 520.

Figure 32:
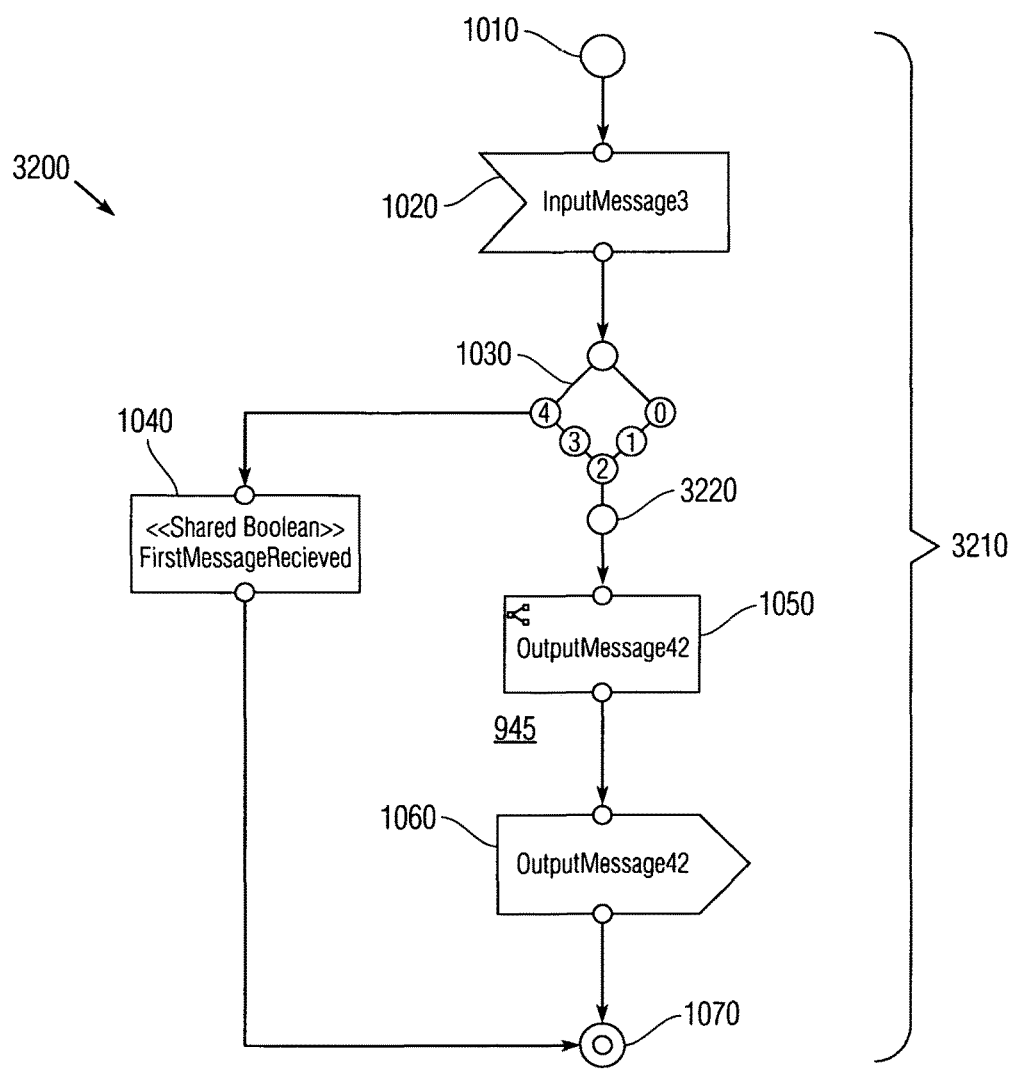
FIG. 32 is a flowchart view of an executing Reactive Scenario.

The claim scope as described by exemplary embodiments extends to the visualization of messages flowing through executing scenarios. FIG. 32 depicts an exemplary detail screen view 3200 of a UML activity diagram 3210 similar to that shown in view 1000. A message, depicted as a center solid circular node 3220, is processed by an example Reactive Scenario. The location of this message node 3220 indicates the stage of the message in the flow of the activity diagram logic, as between the Decision element 1030 and the Message Map element 1050. The Set Shared Variable element 1040 denotes Branch-1 and the Message Map element 1050 denotes Branch-2 as determined by the Decision element 1030. For example, view 3200 indicates that an incoming message (InputMessage3) has triggered this reactive scenario, and that Branch-2 has been taken as a result of the Decision element 1030. The message 3220 has yet to be processed by the subsequent Message Map element 1050 and the DDS Publisher element 1160.

The visualization of executing IBS scenarios assists an operator in understanding the actual message flows during testing of an AUT (as represented by its software component 510). The speed of the visualization can be controlled by an operator to enable near-real-time interpretation of the observed behavior. In addition, the visualization can be recorded, so that an operator can replay the visualization of interface behavior from a test case, to enable offline interpretation and analysis of test results. The visualization and replay capabilities can also be used during the construction of a simulation, to enable an operator to perfect a complex simulation to be used in testing. In addition, breakpoints can be inserted by an operator at various points in an activity diagram that defines a reactive scenario, to enable closer inspection of observed interface behavior.

Figure 33:
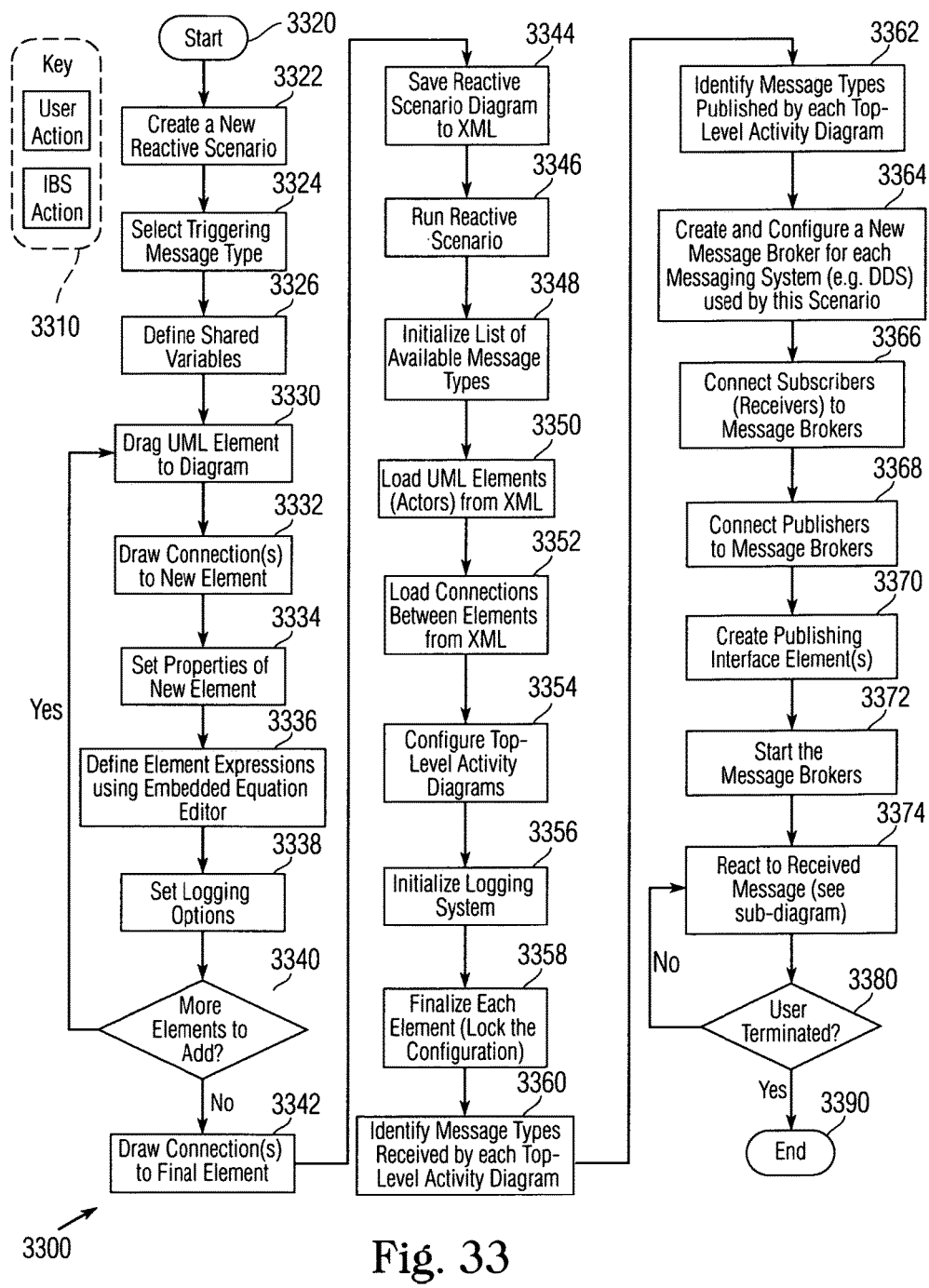
FIG. 33 is a flowchart view of a Reactive Scenario Creation and Execution Method.

FIG. 33 illustrates a flowchart view 3300 of an example visualization of the scenario for Reactive Scenario Creation and Execution Method. A block Key 3310 distinguishes User Action blocks and IBS Action blocks. User actions designate actions an operator performs via the VPE 730. IBS actions pertaining to operations by the IBS 520 in a completely automated manner. The process begins with Start 3320 and proceeds first to Create a New Reactive Scenario 3322; second to Select Triggering Message Type 3324; third to Define Shared Variables 3326; fourth to Drag ULM Element to Diagram 3330; fifth to Draw Connections to New Element 3332; sixth to Set Properties of New Element 3334; seventh to Define Element Expressions using EEE 3336; eighth to Set Logging Options 3338; ninth to Decision 3340 for More Elements to Add? If yes, then the process returns to Drag ULM Element 3330. Otherwise, the process continues at tenth to Draw Connections to Final Element 3342; eleventh to Save Reactive Scenario Diagram to XML 3344; twelfth to Run Reactive Scenario 3346. These steps 3322 through 3346 constitute User Action operations.

The process continues at thirteenth to Initialize List of Available Message Types 3348; fourteenth to Load UML Elements from XML 3350; fifteenth to Load Connections Between Elements from XML 3352; sixteenth to Configure Top-Level Activity Diagrams 3354; seventeenth to Initialize Logging System 3356; eighteenth to Finalize Each Element 3358; nineteenth to Identify Message Types Received by Activity Diagram 3360; twentieth to Identify Message Types Published by Activity Diagram 3362; twenty-first to Create and Configure a New Message Broker 3364; twenty-second to Connect Receivers to Message Brokers 3366; twenty-third to Connect Publishers to Message Brokers 3368; twenty-fourth to Create Publishing Interface Elements 3370; twenty-fifth to Start Message Brokers 3372; twenty-sixth to React to Received Message 3374; twenty-seventh to Decision 3380 for User Terminated? If Yes, the process terminates 3390, and otherwise the process returns to React to Received Message 3374. These steps 3348 through 3374 and 3380 constitute IBS Action operations.

Some of the actions may be performed in different sequences by the operator or by an exemplary embodiment. First, an operator initiates creation 3322 of a new reactive scenario, giving that scenario a name. The operator then selects a message 3324 whose receipt will trigger execution of the scenario. The operator next uses the shared variable editor 960 to define 3326 at least one shared variable that used in the scenario.

The operator then performs a sequence of actions 3330, 3332, 3334, 3336, 3338, 3342, 3344 and 3346 to create the reactive scenario logic by using the IBS ADE 820. To use various UML elements in the scenario, the operator drags at least selected UML element 3330 to the diagram in section 940 of the ADE 820. The operator connects in 3332 the new UML element to at least one other UML element. The operator may set various properties 3334 (e.g., input event type) of the UML element. The operator uses the EEE 830 to define logical expressions 3336 for the UML element.

The operator may set various options for logging information 3338 associated with the UML element when executed by the IBS RLN 725. At least one action in this sequence may be repeated as necessary during an operator's construction of a reactive scenario. When the operator has completed definition of the scenario's logic, they may connect in 3342 the appropriate UML element to a Final element, to complete creation of the scenario. An operator may then save the reactive scenario 3344, whereby IBS saves the scenario in the XML File Repository 740.

When an operator runs (executes) a reactive scenario, the IBS 520 initializes a list of available messages 3348, based on configurable message definition files. The IBS 520 then loads UML elements 3350 and connections 3352 between UML elements from the XML File Repository 740. The IBS 520 then configures the top-level activity diagram 3354, initializes the RLN logging system 3356, and finalizes each UML element 3358 by locking their configuration to remain constant during the simulation.

The IBS 520 next identifies messages that may be received 3360 and published 3362 by each top-level activity diagram. The IBS 520 then creates and configures 3364 at least one Message Broker for each middleware communications standard (e.g., DDS 2920) used by the scenario. Next, the IBS 520 connects message receivers 3366 to the appropriate Message Broker. The IBS 520 then connects message publishers 3368 to the appropriate Message Broker. The IBS 520 next creates at least one publishing interface element 3370, and starts the execution of the created Message Broker 3372. At this point, the IBS 520 is ready to receive and process messages 3374 processed by the reactive scenario.

Figure 34:
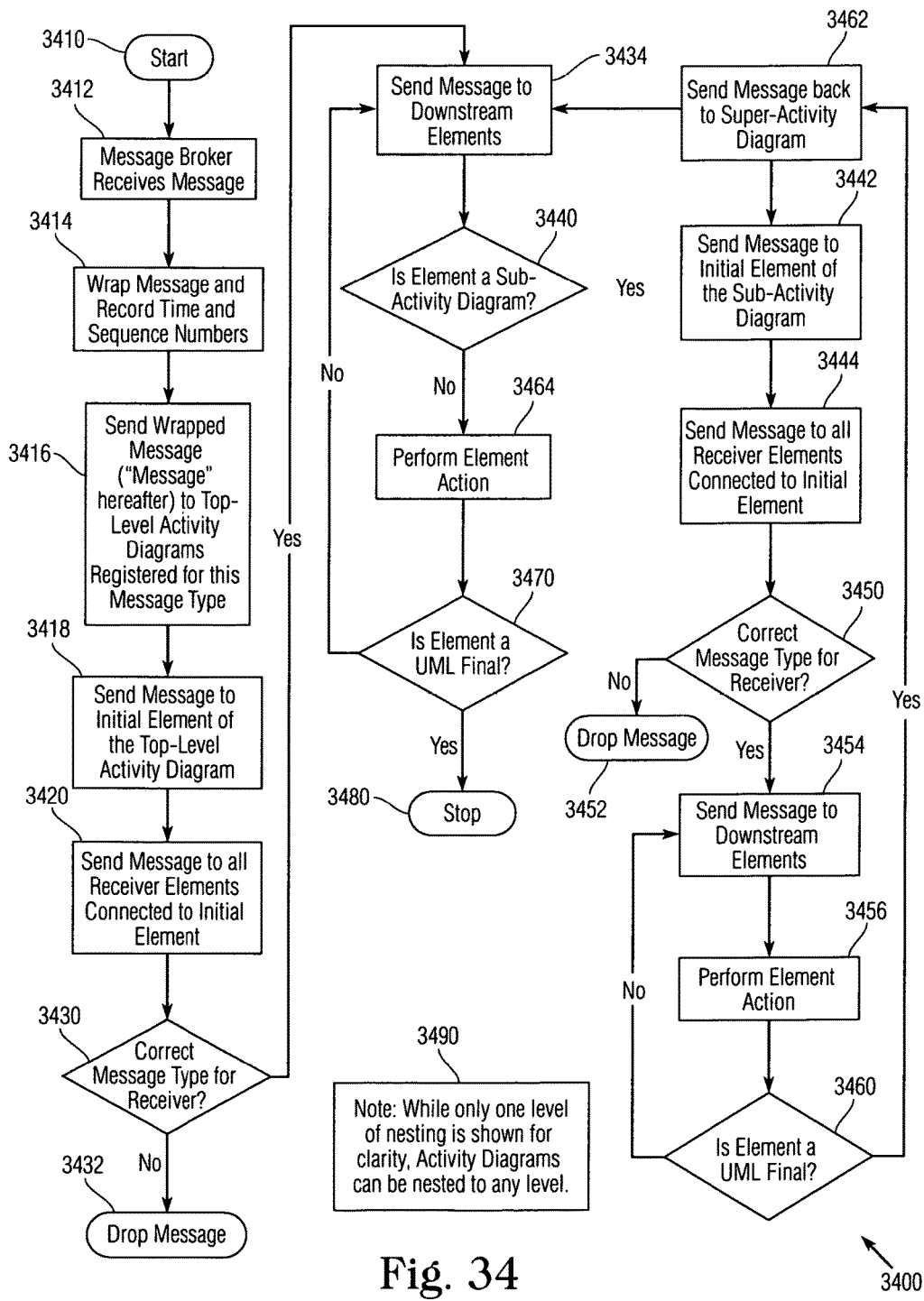
FIG. 34 is a flowchart view of a Reactive Message Processing Method.

In response to the IBS 520 receiving a message that triggers a reactive scenario, the IBS 520 executes the Reactive Message Processing Method, described herein in a completely automated manner. The IBS 520 continues reacting to incoming messages until the operator terminates the execution of the scenario. FIG. 34 illustrates flowchart view 3400 for a method for automated reactive message processing by the IBS 520 during execution of a reactive scenario. Activity diagrams can be nested to any level, with multiple levels of embedded activity diagrams.

This process begins with Start 3410 and proceeds first to Message Broker Receiving a Message 3412; second to Wrap Message and Record Time and Sequence Numbers 3414; third to Send Wrapped Message to Top-Level Activity Diagrams 3416 (for appropriate type); fourth to Send Message to Initial Element at Top-Level Activity Diagram 3418; fifth to Send Message to all Receiver Elements Connected to Initial Element 3420; seventh to Decision 3430 for query: Correct Message Type for Receiver? If no, the process drops the Message 3432.

Otherwise, the process continues at eighth to Send Message to Downstream Elements 3434; ninth to Decision 3440 for query: Is Element a Sub-Activity Diagram? If yes, the process proceeds to tenth Send Message to Initial Element of the Sub-Activity Diagram 3442; eleventh to Send Message to all Receiver Elements Connected to Initial Element 3444; twelfth to Decision 3450 for query: Correct Message Type for Receiver? If not, the process drops the Message 3452. Otherwise, the process continues at thirteenth to Send Message to Downstream Elements 3454; fourteenth to Perform Element Action 3456; fifteenth to Decision 3460 Is Element a UML Final? If not, the process returns to Send Message to Downstream Elements 3454.

Otherwise, the process continues at sixteenth to Send Message back to Super-Activity Diagram 3462, which returns to Send Message to Downstream Elements 3434. At Decision 3440, if no, the process continues at seventeenth to Perform Element Action 3464; and eighteenth to Decision 3470 for query: Is the element a UML Final? If yes, the process stops 3480. Otherwise, the process returns to Send Message to Downstream Elements 3434. Note 3490 that while only one level of nesting is shown, Activity Diagrams can be nested at any level.

The exemplary process can be summarized to proceed as follows: First, the appropriate IBS Message Broker receives a message 3412. The IBS 520 creates a data wrapper 3414 for the Message, which includes time of receipt and an assigned sequence number (for use in message reordering where necessary). The IBS 520 next sends the wrapped Message 3416 to the scenario's top-level activity diagrams 945 that are triggered by the type of Message. Within each top-level activity diagram 945, IBS 520 then sends the Message to the Initial element 1170 of the diagram 945. The Initial element 1170 next sends the Message to all Receiver elements connected to the Initial element 1170. A Receiver element 1145 checks to determine whether the Message is of the correct type to be processed. If not, further operations discontinue on the message.

If at Decision 3430 the Message is of the type the Receiver element 1145 processes, the Message is sent to other UML elements downstream from the Receiver element 1145. The IBS 520 next checks to determine whether a downstream UML element is an embedded (sub-) activity diagram. If not, it performs the actions associated with the UML element. Subsequently, the IBS 520 checks to determine whether the UML element corresponds to a Final element 1115. If not, the IBS 520 repeats the prior described actions. If the UML element is a Final element 1115, then processing of the Message stops.

If a downstream UML element is an embedded (sub-) activity diagram, then the IBS 520 sends a Message to start the Initial element 1170 of the embedded activity diagram 1110. The IBS 520 then sends the Message to all Receiver elements 1145 connected to the Initial element 1170. Each Receiver element 1145 checks to determine whether the Message is of the correct type for it to process. If not, the IBS 520 discontinues processing the Message further.

If the message is of the type the embedded activity diagram's Receiver element processes, the message is sent to other UML elements downstream from the Receiver element 1145. The IBS 520 next performs each UML element's action. Subsequently, The IBS 520 checks to determine whether the UML element is a Final element 1115. If not, it repeats the actions of this paragraph. If the UML element is a Final element 1115, then the embedded Activity Diagram 1110 sends the message to the super-activity diagram (in which it the sub-diagram is embedded), and processing in the super-activity diagram continues.

Figure 35:
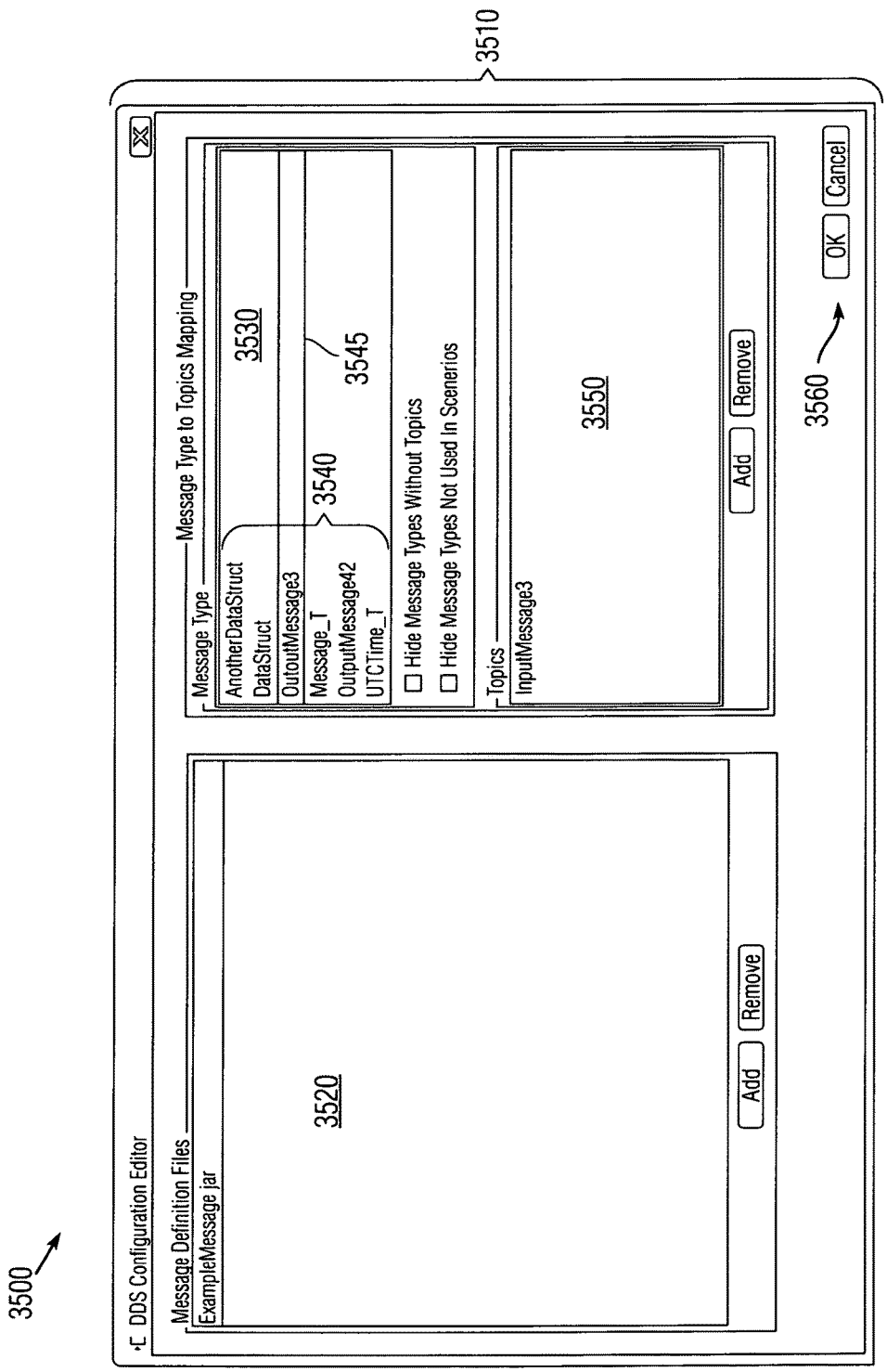
FIG. 35 is a screen view of a Message and Topic Configuration Display.

Along with the functionality described above, the IBS 520 performs several additional functions to support interface behavior simulations. The IBS 520 enables operators to configure such simulations for different sets of messages and message topics. FIG. 35 shows a screen view 3500 for an example Message and Topic Configuration Display 3510 for an exemplary embodiment that supports the DDS middleware communications standard. This display 3510 includes windows for Message Definition Files 3520 on the left side, Message Type 3530 on the upper right with messages 3540 and InputMessage3 highlighted 3545 and Topics 3550, which includes the highlighted 3545 selection 3550, as well as selection options 3560. The display 3510 enables an operator to select a Java ARchive (JAR) file containing sets of user-defined messages, which are derived from the DDS Interface Definition Language (IDL) files. The IBS 520 also enables an operator to associate messages with DDS topics for publication 1140 and subscription 1145 by scenarios.

The IBS 520 functions also support the modification and deletion, in addition to the creation, of scenario bundles and scenarios. Scenarios can also be exported from one user's instantiation of the IBS 520 to another user's instantiation of the IBS 520, using the XML File Repository format previously discussed. Controls for scenario execution are provided, including starting, pausing, and stopping scenario execution. Exemplary embodiments also extend to the incorporation of preplanned (scheduled) scenarios, so that they can be used in conjunction with reactive scenarios. This enables an operator to create and execute both types of simulation (reactive and preplanned) using a single user interface.

An IBS prototype was developed as an exemplary embodiment. Alternative implementations are possible in other embodiments. The prototype has been implemented using the Java, Scala, and Groovy programming languages. The UML ADE 820 can be implemented using the NetBeans Platform framework as a building block to construct the editor for interface behavior simulations. The EEE 830 utilizes the Spring Expression Language (SpEL) and the SpEL Application Programming Interface (API) to represent logic expressions for scenarios in the interactive editor. The XML representation of reactive scenarios has been defined based on the Spring Framework and Akka actor XML schemas.

The IBS RLN 725 has been implemented with actors of custom design using Akka toolkit by Lightbend (formerly Typesafe) Inc. This toolkit provides a framework for actor-based computing and STM, which has been used for the SVS 2980. Based on prior evaluations, DDS messages of various sorts can be defined in the OMG standard Interface Definition Language (IDL), converted to Java source code using Real-Time Innovations' Connext® DDS software toolkit, compiled, and compressed into Java ARchive (JAR) files. The IBS 520 capabilities can be used to configure the prototype to use these message definitions. The IBS prototype can be used to create, execute, and test various example reactive scenarios.

The capabilities of the IBS 520 are designed to be very flexible. An operator can configure the IBS 520 with any set of user-defined messages and associate these with user-specified middleware topics, on which messages can be published and subscribed. The simulation logic and shared variables are defined by an operator, for use in any desired application. In addition, the IBS software architecture is designed to accommodate any middleware standard, for example: Common Object Request Broker Architecture (CORBA), web services, ZeroMQ, and Java Message Service (JMS).

As a result, IBS has strong commercial potential. The commercial software and systems development world has moved very strongly to model-based engineering practices.

UML and the Systems Modeling Language (SysML), an extension of UML, are the prevalent modeling notations used in industry for the design of software-intensive systems. The IBS 520 supports the UML notation, enabling commercial developers to quickly and easily create interface behavior simulations for concept development, interface design verification, developmental testing, software integration, testing, and/or certification efforts. The IBS EEE 830 could be used in other applications outside of reactive simulations. It is useful in any application in which an easy, user-friendly mechanism for building logic expressions is needed.

Exemplary embodiments enable an operator without programming knowledge to rapidly and visually develop interface behavior simulations using model-based engineering practices without requiring custom simulation software. Such simulations can then be used for concept development, interface design verification, developmental testing, software integration, testing, and/or certification efforts.

The following advantages over conventional methods, materials, and apparatus include:

Enables quick simulation of dynamic aspects of software interface behaviors;

Facilitates and quick creation of reactive scenarios without requiring knowledge of computer programming;

Enables visual construction of reactive scenarios using model-based engineering techniques;

Provides a high level of configurability for different message sets and message standards;

Provides an architecture that can easily accommodate different middleware communications standards;

Enables visualization of executing scenarios; and

Provides a scalable simulation architecture.

The following aspects of these embodiments are believed to be novel:

Apparatus with a unique design that enables the full range of configurable interface simulation without need for hard-coded simulation;

Visual design of reactive interface behavior scenarios without requiring knowledge of computer programming;

Extension of UML to enable user design of reactive interface behavior simulations;

Integration of UML-based engineering artifacts, logic-based expressions, and actor-based computing to enable interface behavior simulation;

Unique design for an embedded expression editor;

Ability to easily configure simulation for different message sets and message standards;

Software architecture that can easily accommodate different middleware communications standards;

Scalable simulation architecture that automatically leverages multiple computing cores; and Visualization of executing interface behavior simulation, including user control of visualization speed and insertion of breakpoints in the scenario, to enable closer inspection of test results.

Exemplary embodiments may be implemented in any number of computer programming languages, using various software frameworks, message brokers, data structures, middleware (standards-compliant or unique/proprietary), scenario representation formats, and reactive simulation engines. While certain features of the embodiments of the invention have been illustrated as described herein, many modifications, substitutions, changes, and equivalents will now occur to those skilled in the art. It is, therefore, to be understood that the appended claims are intended to cover all such modifications and changes as fall within the true spirit of the embodiments.

What is claimed is:

1. An interface behavior simulator operating on a non-transitory computer platform equipped with a memory and a processor, executing to analyze and send a message between first and second components via a network, said interface behavior simulator comprising:
   a middleware provider that transports the message over the network;
   an elements loader that loads into the memory a plurality of instruction elements, wherein said plurality of instruction elements including initializing, receiving, deciding, setting of shared variables, forking, joining, message mapping, filtering, publishing, activity diagramming and finalizing;
   a connections loader that connects a first instruction element to a second instruction element in an action configuration;
   an elements finalizer that locks said action configuration;
   an identifier that compares message types from a message type list to an element set of receiving and publishing types, wherein the message accesses said instruction elements for receiving and publishing the message;
   a message broker that publishes and subscribes to the message to a middleware provider, wherein said message broker further including:
      a broker receiver component that receives the message;
      a message wrapper that wraps the message as a wrapper with a record time and sequence numbers,
      a first transmitter that sends said wrapper to a top-level activity diagram element between instruction elements for initializing and receiving;
      a validator that determines validity of said message type for receiving, wherein said wrapper discontinues in response to absence of type validity;
      a second transmitter that sends said wrapper to instruction elements downstream of said receiver component if said message type is valid;
      a response component that performs an action for said instruction element in response to said wrapper;
      a brokering transmitter that connects said instruction element for publishing to said message broker to produce a publishing interface element;
      a brokering initializer that initializes said message broker; and
      a message reactor that executes a message instruction in reaction to the message.

2. The processor according to claim 1, further comprising a message editor that includes:
   an activity diagram editor for visually constructing simulation activity diagrams by dragging and dropping instruction elements;
   an embedded expression editor for visual, drag and drop construction of logic expressions that specify the behavior of a plurality of instruction elements, said plurality including deciding, shared variable setting and message mapping;
   an XML file repository containing simulation specifications defined in a unique XML-based reactive logic definition format; and
   a shared variable systems using software transactional memory for communicating the values of variables between multiple simulations.

3. The processor according to claim 1, wherein said message broker further includes sending said wrapper to instruction elements for a sub-activity diagram.

4. The processor according to claim 1, wherein said instruction element for message mapping includes displaying a flowchart with visual icons that indicate completed operations, uncompleted operations, and decision forks.

5. The processor according to claim 1, wherein said middleware provider initializes said message type list.

* * * * *